(12) United States Patent
Gao et al.

(10) Patent No.: US 11,196,989 B2
(45) Date of Patent: Dec. 7, 2021

(54) VIDEO ENCODING METHOD, DEVICE AND STORAGE MEDIUM USING RESOLUTION INFORMATION

(71) Applicant: TENCENT TECHNOLOGY (SHENZHEN) COMPANY LTD, Guangdong (CN)

(72) Inventors: Xinwei Gao, Shenzhen (CN); Xu Nan Mao, Shenzhen (CN); Chen Chen Gu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/991,175

(22) Filed: Aug. 12, 2020

(65) Prior Publication Data

US 2020/0374514 A1  Nov. 26, 2020

Related U.S. Application Data

(63) Continuation of application No. PCT/CN2019/089817, filed on Jun. 3, 2019.

(30) Foreign Application Priority Data

Jun. 20, 2018  (CN) .......................... 201810637332.9

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/172* (2014.11); *H04N 19/126* (2014.11); *H04N 19/61* (2014.11)

(58) Field of Classification Search
CPC .. H04N 19/105; H04N 19/126; H04N 19/132; H04N 19/172; H04N 19/61; H04N 19/103; H04N 19/136; H04N 19/587
(Continued)

(56) References Cited

U.S. PATENT DOCUMENTS 8,315,310 B2 * 11/2012 Shi ....................... H04N 19/139
375/240.16
2006/0114999 A1 * 6/2006 Han ..................... H04N 19/134
375/240.19
(Continued)

FOREIGN PATENT DOCUMENTS

CN   101938652 A   1/2011
CN   103813174 A   5/2014
(Continued)

OTHER PUBLICATIONS

D. Schroeder, A. Ilangovan and E. Steinbach, "Multi-rate encoding for HEVC-based adaptive HTTP streaming with multiple resolutions," 2015 IEEE 17th International Workshop on Multimedia Signal Processing (MMSP), 2015, pp. 1-6, doi: 10.1109/MMSP.2015.7340822. (Year: 2015).*

(Continued)

*Primary Examiner* — Marnie A Matt
(74) *Attorney, Agent, or Firm* — Sughrue Mion, PLLC

(57) ABSTRACT

A video encoding and decoding method, apparatus, a computer device, and a storage medium. The method includes obtaining a current frame to be encoded; determining a resolution determining mechanism among a plurality of resolution determining mechanisms to be performed on a reference frame based on a resolution relationship between the current frame and a reference frame corresponding to the current frame; generating the reference frame corresponding to the current frame according to the resolution determining mechanism; and encoding the current frame according to the (Continued)

reference frame to obtain encoded data corresponding to the current frame, the encoded data including the resolution relationship.

14 Claims, 10 Drawing Sheets

(51) Int. Cl.
*H04N 19/172* (2014.01)
*H04N 19/126* (2014.01)
*H04N 19/61* (2014.01)

(58) Field of Classification Search
USPC .................................................. 375/240.03
See application file for complete search history.

(56) References Cited

U.S. PATENT DOCUMENTS

| | | | |
|---|---|---|---|
| 2010/0208086 A1 | 8/2010 | Kothandaraman et al. | |
| 2011/0013692 A1* | 1/2011 | Cohen | H04N 19/59 375/240.02 |
| 2016/0119642 A1* | 4/2016 | Wu | H04N 19/105 375/240.12 |
| 2019/0253704 A1* | 8/2019 | Mao | H04N 19/132 |
| 2019/0394476 A1* | 12/2019 | Mao | H04N 19/33 |

FOREIGN PATENT DOCUMENTS

| | | | | |
|---|---|---|---|---|
| CN | 107155107 A | 9/2017 | | |
| CN | 107211123 A | 9/2017 | | |
| CN | 108848376 A | 11/2018 | | |
| CN | 109618159 A | * 11/2018 | ........... | H04N 19/132 |

OTHER PUBLICATIONS

International Search Report for PCT/CN2019/089817 dated Sep. 3, 2019 [PCT/ISA/210].
Written Opinion of the International Searching Authority for PCT/CN2019/089817 dated Sep. 3, 2019 [PCT/ISA/237].
Written Opinion of the International Searching Authority dated Sep. 3, 2019 in Application No. PCT/CN2019/089817.

* cited by examiner

VIDEO ENCODING METHOD, DEVICE AND STORAGE MEDIUM USING RESOLUTION INFORMATION

CROSS-REFERENCE TO RELATED APPLICATION(S)

This application is a continuation of PCT/CN2019/089817, filed on Jun. 3, 2019, and claims priority to Chinese Patent Application No. 201810637332.9, entitled "VIDEO ENCODING AND DECODING METHOD AND DEVICE, COMPUTER DEVICE, AND STORAGE MEDIUM," filed with the National Intellectual Property Administration, PRC on Jun. 20, 2018, which are incorporated herein by reference in their entireties.

BACKGROUND

1. Field

Embodiments of this disclosure relate to the field of video encoding, and in particular, to a video encoding and decoding method and apparatus, a computer device, and a storage medium.

2. Description of Related Art

With the development of digital media technologies and computer technologies, videos are applied in various fields, such as mobile communication, network surveillance, and network television. With the improvement of hardware performance and screen resolution, users have increasing demand for high-definition videos.

With limited bandwidth, a conventional encoder encodes video frames in a way that causes video quality in some scenarios to be poor. For example, under the condition of 750 kbps, when all video frames are encoded indiscriminately, the quality of some video frames is poor. For example, encoders based on H.264\H.265\iOS all have similar problems.

SUMMARY

Embodiments of the disclosure provide a video encoding and decoding method and apparatus, a computer device, and a storage medium, capable of improving encoding quality and efficiency of video frames.

According to an embodiment, there is provided a method, performed by a computer device, the method includes: obtaining a current frame to be encoded; determining a resolution determining mechanism among a plurality of resolution determining mechanisms to be performed on a reference frame based on a resolution relationship between the current frame and a reference frame corresponding to the current frame; generating the reference frame corresponding to the current frame according to the resolution determining mechanism; and encoding the current frame according to the reference frame to obtain encoded data corresponding to the current frame, the encoded data including the resolution relationship.

According to an embodiment, there is provided an apparatus, including: at least one memory storing computer program code; and at least one processor configured to access the at least one memory and operate as instructed by the computer program code. The computer program code includes: video frame obtaining code configured to cause the at least one processor to obtain a current frame; manner determining code configured to cause the at least one processor to determine a resolution determining mechanism among a plurality of resolution determining mechanisms to be performed on a reference frame based on a resolution relationship between the current frame and a reference frame corresponding to the current frame; reference frame generating code configured to cause the at least one processor to generate the reference frame corresponding to the current frame according to the resolution determining mechanism; and video frame encoding code configured to cause the at least one processor to encode the current frame according to the reference frame to obtain encoded data corresponding to the current frame, the encoded data including the resolution relationship.

According to an embodiment, there is provided a non-transitory computer readable storage medium storing at least one computer program code configured to cause at least one computer processor to: obtain a current frame; determine a resolution determining mechanism among a plurality of resolution determining mechanisms to be performed on a reference frame based on a resolution relationship between the current frame and a reference frame corresponding to the current frame; generate the reference frame corresponding to the current frame according to the resolution determining mechanism; and encode the current frame according to the reference frame to obtain encoded data corresponding to the current frame, the encoded data including the resolution relationship.

DETAILED DESCRIPTION

To make the objectives, technical solutions, and advantages of the present disclosure clearer and more comprehensible, the following describes the present disclosure in detail with reference to the accompanying drawings. It is to be understood that the specific embodiments described herein are merely used to explain the present disclosure but are not intended to limit the scope of the present disclosure.

Figure 1:
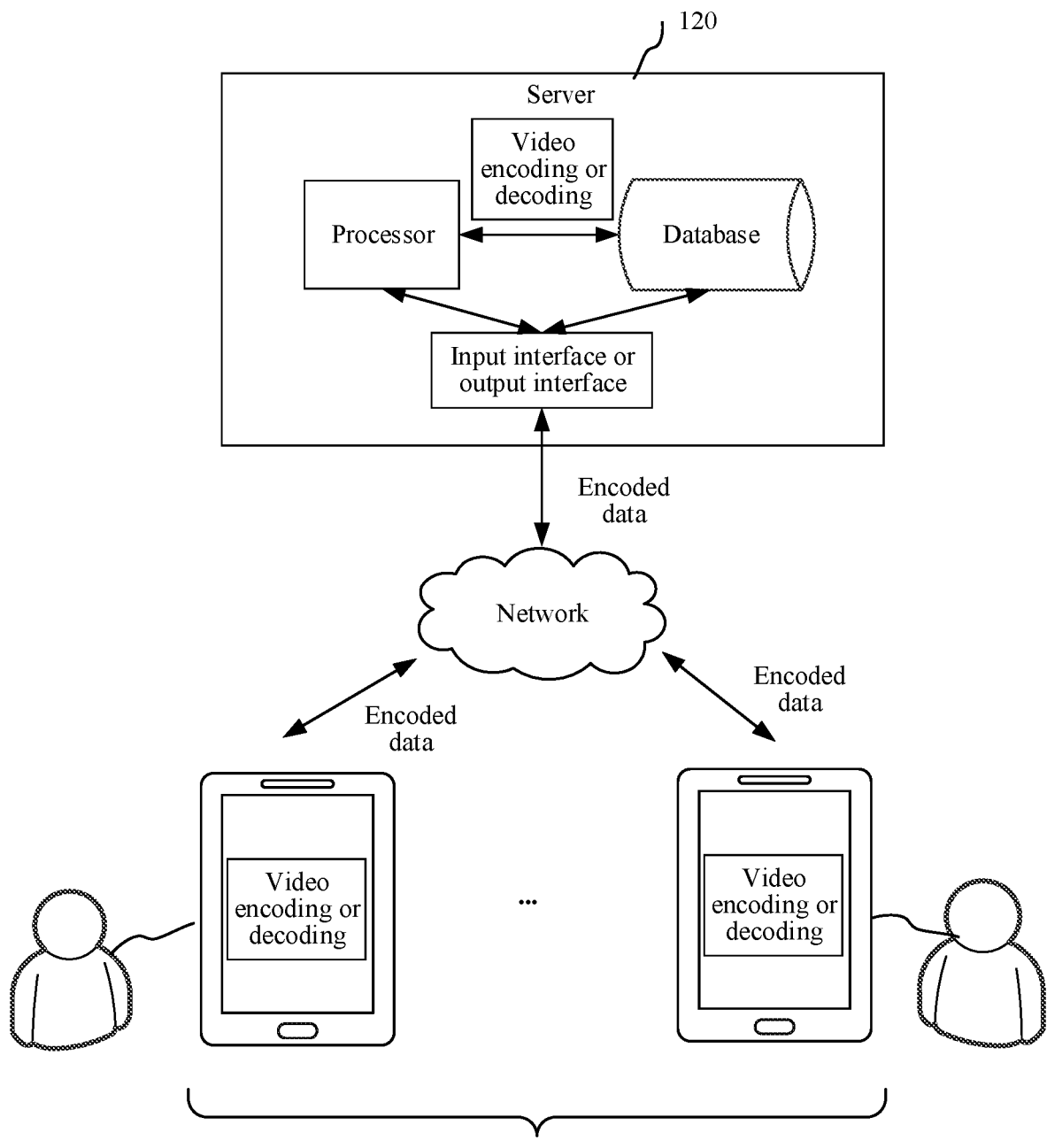
FIG. 1 is a diagram of an application scenario of a video encoding method or a video decoding method according to an embodiment.

FIG. 1 is a diagram of an application scenario of a video encoding method or a video decoding method according to an embodiment. Referring to FIG. 1, the application scenario includes a terminal 110 and a server 120.

The video encoding method and the video decoding method may be completed in the terminal 110 or the server 120. The terminal 110 may encode an input video frame by using the video encoding method, and send encoded data to the server 120. The terminal 110 may receive encoded data from the server 120, decode the encoded data, and generate a decoded video frame. The server 120 may encode a video frame. In this case, the video encoding method is completed in the server 120. If the server 120 needs to decode the encoded data, the video decoding method is completed in the server 120. Certainly, after receiving the encoded data sent by the terminal 110, the server 120 may send the encoded data to a corresponding receiving terminal, so that the encoded data is decoded by the receiving terminal.

The terminal 110 is connected to the server 120 by a network. The terminal 110 may be a desktop terminal or a mobile terminal, and the mobile terminal may be at least one of a mobile phone, a tablet computer, a notebook computer, and the like, but is not limited thereto. The server 120 may be implemented by using an independent server or a server cluster that includes a plurality of servers. The server 120 includes a processor, an input interface or an output interface, and a database. The input interface is configured to receive an input video frame or encoded data. The output interface is configured to output a decoded video frame or encoded data. The processor is configured to encode an input video frame or decode encoded data. The database is configured to store at least one of an input video frame, encoded data, and a decoded video frame.

Figure 2:
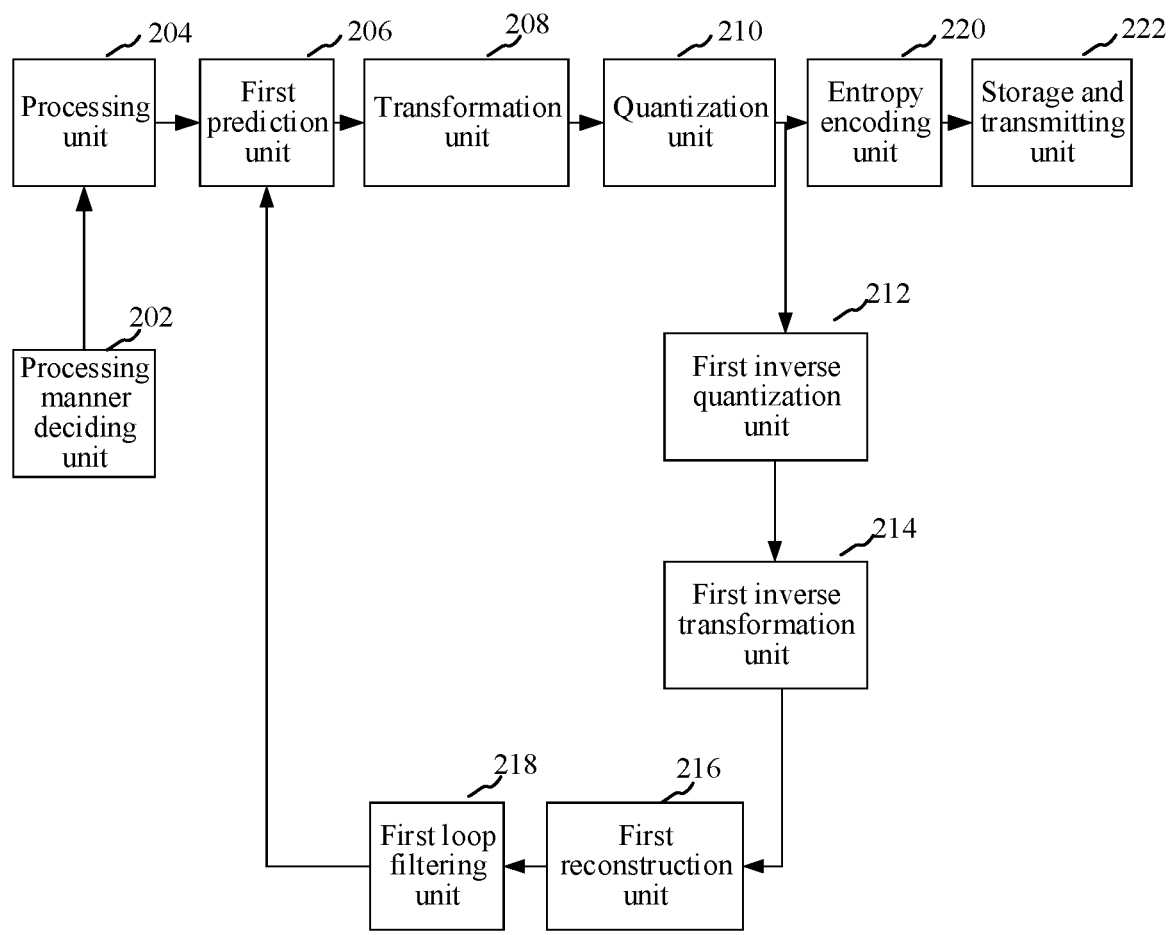
FIG. 2 is an encoding framework diagram illustrating a video encoding method according to an embodiment.

FIG. 2 is an encoding framework diagram corresponding to a video encoding method according to an embodiment. In the video encoding method provided in this embodiment, input video frames of an input video sequence may be encoded to obtain corresponding encoded data. Here, the encoded data is stored or transmitted by using a storage and transmitting unit 222. In a processing manner of a deciding unit 202, a processing manner of the input video frame may be determined to obtain a processing manner corresponding to the input video frame. In a processing unit 204, the input video frame may be processed according to the determined processing manner to obtain a to-be-encoded video frame. In a first prediction unit 206, intra-frame prediction or inter-frame prediction may be performed on each code block of a to-be-encoded video frame under a resolution of the to-be-encoded video frame, and a predicted value and a corresponding motion vector are obtained according to an image value of a reference block corresponding to the code block. An actual value of the code block is subtracted from the predicted value to obtain a prediction residual, and the motion vector represents a displacement of the code block relative to the reference block. In a transformation unit 208, the prediction residual and vector information in a space domain are transformed into a frequency domain, and a transformation coefficient may be encoded. The transformation method may be discrete Fourier transform, discrete cosine transform, or the like. The vector information may be an actual motion vector that represents a displacement or a motion vector difference. The motion vector difference is a difference between an actual motion vector and a predicted motion vector.

In a quantization unit 210, the transformed data is mapped to be another numeric value. For example, the transformed data may be divided by a quantization step to obtain a smaller value. A quantization parameter is a sequence number corresponding to a quantization step, and a corresponding quantization step may be found according to a quantization parameter. A small quantization parameter indicates reservation of most details of an image frame and a high corresponding bit rate. A large quantization parameter indicates a low bit rate, a great distortion and a low quality image. A principle of quantization is expressed by using the following formula: $FQ=round(y/Qstep)$, where y is a value corresponding to a video frame before quantization is performed, Qstep is a quantization step, and FQ is a quantized value obtained by quantizing y. The round(x) function is used for performing rounding off to an even number on the quantized value, that is, Banker's rounding. A correspondence between the quantization parameter and the quantization step may be set according to various embodiments. For example, in some video encoding standards, for brightness encoding, the quantization step has 52 values that are integers from 0 to 51. For chroma encoding, the quantization step has values that are integers from 0 to 39. In addition, the quantization step increases as the quantization parameter increases. Each time the quantization parameter is increased by 6, the quantization step is doubled.

An entropy encoding unit 220 is configured to perform entropy encoding. The entropy encoding is a data encoding manner of encoding based on an entropy principle without losing any information to express a certain amount of information with relatively few characters. An entropy encoding method may be, for example, Shannon coding or Huffman coding.

A reconstruction path may include a first inverse quantization unit 212, a first inverse transformation unit 214, a first reconstruction unit 216, and a first loop filtering unit 218. A frame is reconstructed by using the units of the reconstruction path to obtain a reference frame and to ensure consistency of reference frames in encoding and decoding. A step performed by the first inverse quantization unit 212 is an inverse process of quantization. A step performed by the first inverse transformation unit 214 is an inverse process of the transformation that is performed by the transformation unit 210. The first reconstruction unit 216 is configured to add residual data obtained through inverse transformation to predicted data to obtain a reconstructed reference frame. The first loop filtering unit 218 is configured to perform loop filtering to reduce a blocking artifact of the video frame and improve video quality.

Figure 3:
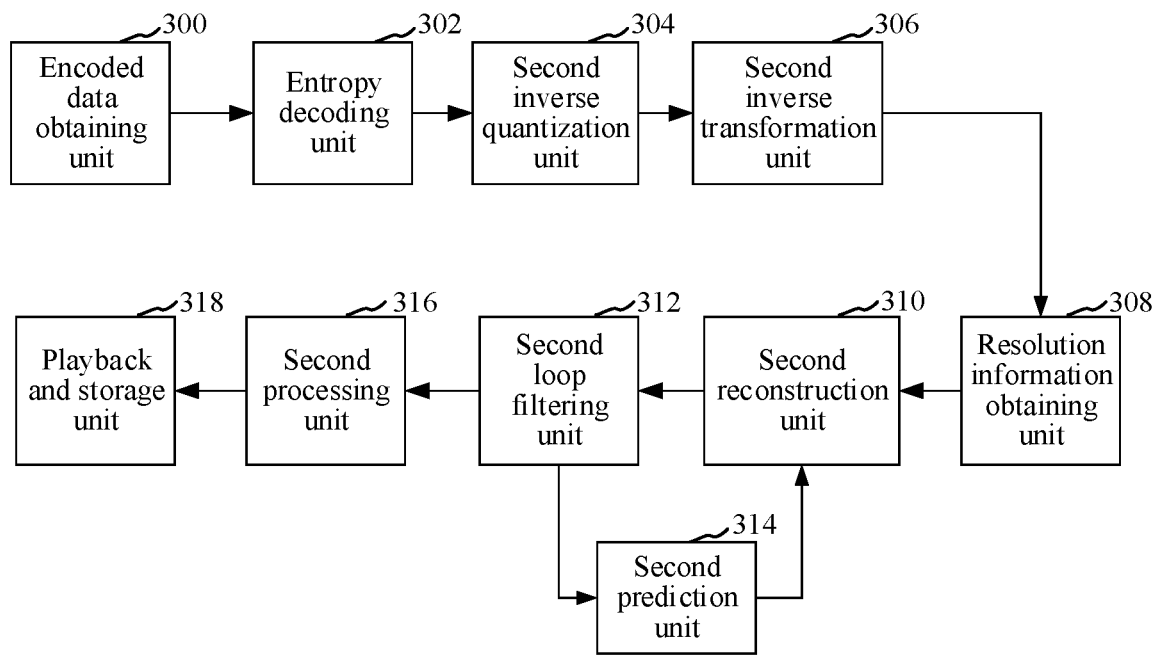
FIG. 3 is a decoding framework diagram illustrating a video decoding method according to an embodiment.

FIG. 3 is a decoding framework diagram corresponding to a video decoding method according to an embodiment. According to the video decoding method provided in this embodiment, encoded data corresponding to each to-be-decoded video frame of a to-be-decoded video sequence is obtained by an encoded data obtaining unit 300. The encoded data obtaining unit 300 transmits the encoded data to an entropy decoding unit 302. The entropy decoding unit 302 performs entropy decoding to obtain entropy-decoded data; a second inverse quantization unit 304 performs inverse quantization on the entropy-decoded data to obtain inversely quantized data; a second inverse transformation unit 306 performs inverse transformation on the inversely quantized data to obtain inversely transformed data. The inversely transformed data may be consistent with the data that is obtained after inverse transformation performed by the first inverse transformation unit 214 in FIG. 2. A resolution information obtaining unit 308 is configured to obtain resolution information corresponding to the to-be-decoded video frame. A second loop filtering unit 312 performs loop filtering on the reconstructed video frame obtained through reconstruction by a second reconstruction unit 310. A second prediction unit 314 obtains a reference block of a to-be-decoded block according to motion vector information, and obtains a predicted value consistent with the predicted value in FIG. 2 according to an image value of the reference block. The second reconstruction unit 310 performs reconstruction according to the predicted value and inversely transformed data, that is, a prediction residual, to obtain the reconstructed video frame. A second processing unit 316 processes the reconstructed video frame according to the resolution information corresponding to the to-be-decoded video frame to obtain a corresponding decoded video frame. A playback and storage unit 318 may play or store, or play and store the decoded video frame.

It may be appreciated that the foregoing encoding framework diagram and decoding framework diagram are merely an example, and do not limit the video encoding method or the video decoding method to which the solution of this application is applied. A specific encoding framework diagram and decoding framework diagram may include more or fewer units than those shown in the figure, or some units may be combined, or a different component and unit deployment may be used. For example, loop filtering may not be performed.

Figure 4:
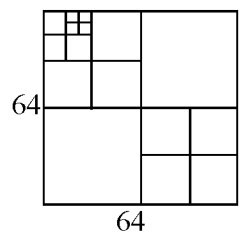
FIG. 4 is a schematic diagram of division of pixel image blocks according to an embodiment.

The to-be-encoded video frame may be divided into a plurality of code blocks, and a size of the code block may be set according to a requirement or obtained through calculation. For example, the size of each code block may be 8*8 pixels. Alternatively, rate-distortion costs corresponding to various code block division manners may be calculated to select a division manner with a small rate-distortion cost for code block division. FIG. 4 is a schematic diagram of division of a 64*64 pixel image block, where one cube represents one code block. It Here, sizes of code blocks may include 32*32 pixels, 16*16 pixels, 8*8 pixels, and 4*4 pixels. In addition, the code blocks may have other sizes, for example, 32*16 pixels or 64*64 pixels. It may be appreciated that during decoding, because code blocks correspond to to-be-decoded blocks in a one-to-one manner, pixel sizes of the to-be-decoded blocks may also include 32*32 pixels, 16*16 pixels, 8*8 pixels, 4*4 pixels, and the like.

In an embodiment, the video encoding method and the video decoding method may be applied to an application having a video call function, and the application may be a social application or an instant messaging application. When two terminals installed with the application may perform a video call process. For example, a first terminal acquires a video frame through a camera, then encodes the video frame by using a video encoding function of the application to obtain encoded data, and sends the encoded data to a back-end server of the application, so that the back-end server forwards the encoded data to a second terminal. After receiving the encoded data, the second terminal decodes the encoded data by using a video decoding function according to the application, reconstructs the encoded data to obtain a video frame, and then displays the video frame. Similarly, the second terminal may send, through the back-end server, encoded data obtained through encoding to the first terminal, and the first terminal performs decoding and display, thereby implementing a video call between the two parties.

In another embodiment, the video encoding method and the video decoding method may be applied to an application having a video playback function, and the application may be a live video application, a short video application or a video playback application. A terminal installed with the application may acquire a video frame through a camera, then encode the video frame by using a video encoding function of the application to obtain encoded data, and send the encoded data to a back-end server of the application. When another terminal requests to watch the video, the back-end server sends the encoded data of the video to the another terminal, and the application in the another terminal decodes the encoded data, thereby playing the video.

The foregoing embodiments are only used as examples for description. The video encoding method and the video decoding method provided in the embodiments of the disclosure may also be applied to other scenarios that require video encoding and decoding.

Figure 5:
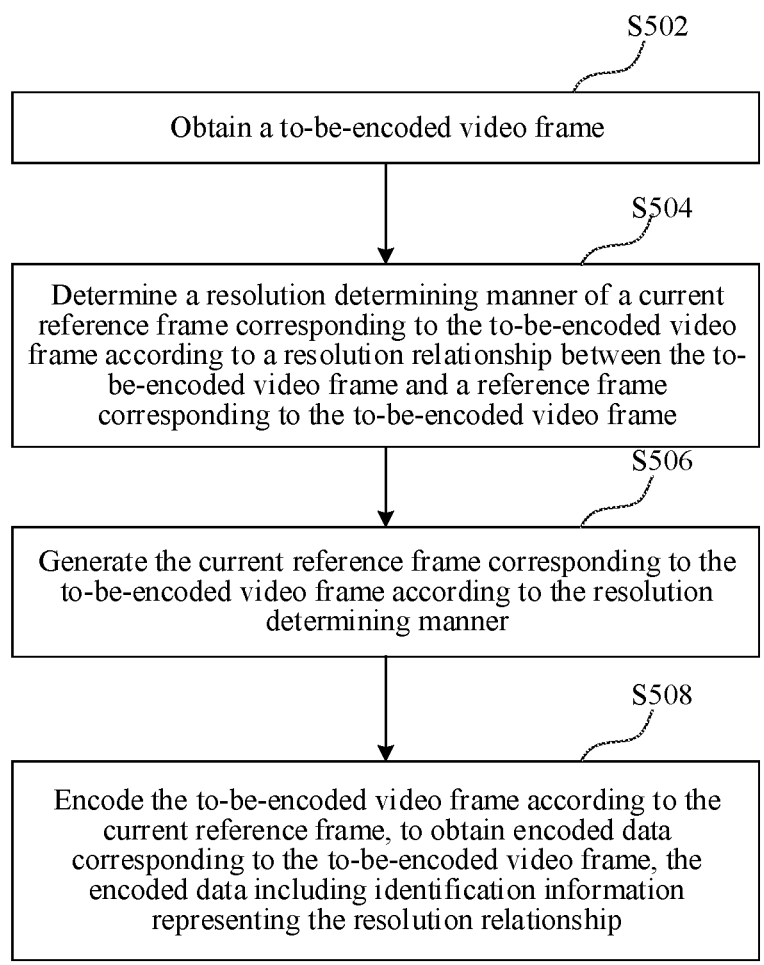
FIG. 5 is a flowchart of a video encoding method according to an embodiment.

FIG. 5 is a flowchart of a video encoding method according to an embodiment. This embodiment is described mainly by using an example in which the method is applied to the terminal 110 or the server 120 in FIG. 1. An encoder side may be the terminal 110 or the server 120. Referring to FIG. 5, the video encoding method includes the following steps.

In S502, the method may include obtaining a to-be-encoded video frame.

The to-be-encoded video frame is obtained after an input video frame is processed. When a processing manner for processing the input video frame includes a full-resolution processing manner, the input video frame may be used as the to-be-encoded video frame. When a processing manner for processing the input video frame includes a downsampling processing manner, the input video frame may be downsampled to obtain the to-be-encoded video frame.

For example, when a resolution of the input video frame is 800*800 pixels and the processing manner is 1/2 downsampling in both a horizontal direction and a vertical direction, a resolution of the to-be-encoded video frame obtained after downsampling is 400*400 pixels.

The input video frame is a basic unit forming a video, and one video sequence or one group of picture (GOP) may include a plurality of video frames. The input video frame may be a video frame acquired in real time, for example, a video frame obtained in real time through a camera of a terminal, or a video frame corresponding to a stored video. The input video frame may be an I frame, a P frame or a B frame, where the I frame is an intra-predicted frame, the P frame is a forward predicted frame, and the B frame is a bi-directional predicted frame.

In an embodiment, the server obtains the input video frame and processes the input video frame according to a corresponding processing manner to obtain a to-be-encoded video frame.

In S504, the method may include determining a resolution determining manner of a current reference frame corresponding to the to-be-encoded video frame according to a resolution relationship between the to-be-encoded video frame and a reference frame corresponding to the to-be-encoded video frame.

The resolution relationship between the to-be-encoded video frame and the reference frame corresponding to the to-be-encoded video frame is a reference relationship between a resolution of the to-be-encoded video frame and a resolution of the reference frame corresponding to the to-be-encoded video frame. The resolution relationship between the to-be-encoded video frame and the reference frame includes a to-be-encoded video frame with a full resolution is referenced to a reference frame with a downsampled resolution, a to-be-encoded video frame with a downsampled resolution is referenced to a reference frame with a full resolution, a to-be-encoded video frame with a full resolution is referenced to a reference frame with a full resolution, and a to-be-encoded video frame with a downsampled resolution is referenced to a reference frame with a downsampled resolution.

The resolution determining manner is used for determining a processing manner for a resolution value. The current reference frame is a video frame used as a reference during encoding of the to-be-encoded video frame. The current reference frame is a video frame obtained by reconstructing encoded data corresponding to a video frame that can be used as a reference frame. According to different inter-frame prediction types, the current reference frame corresponding to the current to-be-encoded video frame may be a forward reference frame or a bi-directional reference frame, and there may be one or more current reference frames corresponding to the to-be-encoded video frame.

For example, when the to-be-encoded video frame is a P frame, there may be one corresponding reference frame. For example, when the to-be-encoded video frame is a B frame, there may be two corresponding reference frames. The reference frame corresponding to the to-be-encoded video frame may be obtained according to a reference relationship, and the reference relationship may vary according to various video encoding and decoding standards. For example, if the second video frame in a group of pictures (GOP) is a B frame, the corresponding reference frames are an I frame of the GOP and the fourth frame of the GOP. Alternatively, the current reference frame corresponding to the to-be-encoded video frame may be the first one or two frames in forward encoded frames of the to-be-encoded video frame.

In an embodiment, the server determines the resolution relationship between the obtained to-be-encoded video frame and the reference frame corresponding to the to-be-encoded video frame, and determines the resolution determining manner of the current reference frame corresponding to the to-be-encoded video frame according to the resolution relationship between the to-be-encoded video frame and the corresponding reference frame.

In an embodiment, the server extracts resolution information of the reference frame from the obtained resolution relationship, and determines the resolution determining manner of the current reference frame according to the extracted resolution information of the reference frame.

For example, if the resolution information of the reference frame extracted by the server is a downsampled-resolution reference frame, the resolution determining manner of the current reference frame is a downsampling determining manner. If the resolution information of the reference frame extracted by the server is an original-resolution reference frame, the resolution determining manner of the current reference frame is an original-resolution determining manner.

In S506, the method may include generating the current reference frame corresponding to the to-be-encoded video frame according to the resolution determining manner.

In addition, the server may store various reconstructed reference frames with different resolutions corresponding to the to-be-encoded video frame. The server selects a reference frame from the stored reference frames according to the resolution determining manner, and uses the selected reference frame as the current reference frame corresponding to the to-be-encoded video frame.

In an embodiment, after obtaining the encoded data corresponding to the current reference frame, the encoder side may perform entropy decoding, inverse quantization, and inverse transformation on the encoded data, to obtain a prediction residual corresponding to each intra-frame prediction block, and then add up the prediction residual and a corresponding reference block to obtain each reconstructed block, thereby obtaining a reconstructed video frame of the input video frame, that is, the current reference frame.

In S508, the method may include encoding the to-be-encoded video frame according to the current reference frame to obtain encoded data corresponding to the to-be-encoded video frame, the encoded data including identification information representing the resolution relationship.

The to-be-encoded video frame may be encoded under the resolution of the to-be-encoded video frame. The encoding may include at least one of prediction, transformation, quantization, and entropy encoding. The server obtains the current reference frame corresponding to the to-be-encoded video frame, performs prediction according to the current reference frame to obtain a prediction residual, performs transformation, quantization, entropy encoding, and the like on the prediction residual to obtain encoded data corresponding to the to-be-encoded video frame, and adds, to the encoded data, identification information representing the resolution relationship.

In an embodiment, the server detects whether a resolution of the current reference frame is the same as a resolution of the to-be-encoded video frame. If the server determines that the resolution of the current reference frame is the same as the resolution of the to-be-encoded video frame, the server performs prediction on the current reference frame to obtain a prediction residual, and performs transformation, quantization, entropy encoding, and the like on the prediction residual to obtain encoded data corresponding to the to-be-encoded video frame. Furthermore, the server adds, to the encoded data, identification information representing the resolution relationship. Alternatively, the server samples the current reference frame, so that a resolution of the current reference frame after sampling is the same as the resolution of the to-be-encoded video frame, performs prediction on the current reference frame after sampling to obtain a prediction residual, performs transformation, quantization, entropy encoding, and the like on the prediction residual to obtain encoded data corresponding to the to-be-encoded video frame, and adds, to the encoded data, identification information representing the resolution relationship.

For example, during calculation of the prediction residual, the current reference frame may be sampled according to the resolution information of the to-be-encoded video frame to obtain a target reference frame having a resolution consistent with that of the to-be-encoded video frame. Then, reference blocks corresponding to code blocks in the to-be-encoded video frame are obtained from the target reference frame. Prediction is performed according to the reference blocks to obtain predicted values corresponding to the code blocks. Prediction residuals are generated according to differences between actual values and the predicted values of the code blocks. During calculation of a motion vector value, if the reference frame has a different resolution, location information of the code block or location information of a decoded block may be transformed according to the resolutions of the reference frame and the to-be-encoded video frame. Then, the motion vector value is obtained according to transformed location information.

In an embodiment, the encoding the to-be-encoded video frame under the resolution of the to-be-encoded video frame to obtain encoded data corresponding to the input video frame includes: obtaining an encoding manner corresponding to the encoding of the to-be-encoded video frame under the resolution of the to-be-encoded video frame; and adding, to the encoded data corresponding to the input video frame, encoding manner information corresponding to the encoding manner.

The encoding manner is a processing manner related to encoding performed by the encoder side. For example, the encoding manner may include one or more of the following: an upsampling manner used by a video frame reconstructed after decoding of the reference frame during encoding, a rule corresponding to a reference rule, and sub-pixel interpolation on the reference frame. The encoder side adds, to the encoded data corresponding to the input video frame, encoding manner information corresponding to the encoding manner, so that the decoder side may decode a to-be-decoded video frame according to the encoding manner information.

In an embodiment, the encoding manner information corresponding to the encoding manner may not be added to the encoded data. Instead, an encoding manner is preset in the encoder side and the decoder side, and a decoding manner corresponding to the encoding manner is set in the decoder side. Alternatively, the encoder side and the decoder side may obtain a corresponding encoding manner and decoding manner through calculation according to a same algorithm or corresponding algorithms. For example, it may be preset in an encoding and decoding standard that a method used by the encoder side for upsampling the current reference frame is the same as a method used by the decoder side for upsampling the current reference frame.

In an embodiment, the encoder side may determine a first vector transformation parameter according to the resolution information of the to-be-encoded video frame and first resolution information, where the first resolution information includes the resolution information of the current reference frame or target motion vector unit resolution information corresponding to the input video frame. The encoder may obtain target motion vectors corresponding to the code blocks in the to-be-encoded video frame according to the first vector transformation parameter.

Here, the first vector transformation parameter is used for transforming location information for obtaining a motion vector or for transforming a motion vector. The resolution information is information related to a resolution, and may be, for example, the resolution itself or a downsampling ratio. The first vector transformation parameter may be a ratio between the resolution information of the to-be-encoded video frame and the first resolution information. For example, if a downsampling ratio of the current reference frame is 1/3, and a downsampling ratio of the to-be-encoded video frame is 1/6, the first vector transformation parameter may be 1/3 divided by 1/6, that is, 2.

In an embodiment, after the first vector transformation parameter is obtained, the obtained motion vector or the location information corresponding to the motion vector is transformed according to the first vector transformation parameter to obtain the target motion vector. When the target motion vector is transformed by using the first vector transformation parameter, the target motion vector is made to be a motion vector under a target resolution represented by the target motion vector unit resolution information. The target motion vector unit resolution information is information corresponding to a target resolution corresponding to a unit of the target motion vector, and may be, for example, the target resolution itself or a downsampling ratio. When the location information corresponding to the motion vector is transformed by using the first vector transformation parameter, location information corresponding to the to-be-encoded video frame and the location information of the current reference frame are made to be under a same quantization scale. A second motion vector is obtained according to transformed location information, and the second motion vector is transformed to be the target motion vector under the target resolution.

In an embodiment, the encoding may include at least one prediction, transformation, quantization, or entropy encoding. When the to-be-encoded video frame is an I frame, intra-frame prediction is performed on the to-be-encoded video frame under the resolution of the to-be-encoded video frame. When the to-be-encoded video frame is a P frame and a B frame, the current reference frame corresponding to the to-be-encoded video frame may be obtained. Prediction is performed according to the current reference frame to obtain a prediction residual, and transformation, quantization, and entropy encoding are performed on the prediction residual to obtain encoded data corresponding to the input video frame. In the process of obtaining the encoded data, at least one of the current reference frame, the location information corresponding to each code block of the to-be-encoded video frame, the location information of each reference block of the current reference frame, or the motion vector is processed according to the resolution of the to-be-encoded video frame. For example, during calculation of the prediction residual, the current reference frame may be processed according to the resolution information of the to-be-encoded video frame to obtain a target reference frame. Target reference blocks corresponding to the code blocks in the to-be-encoded video frame are obtained from the target reference frame. Prediction is performed according to the target reference blocks to obtain predicted values corresponding to the code blocks. Then, prediction residuals are obtained according to differences between actual values and the predicted values of the code blocks. During calculation of the target motion vector, if the resolution of the current reference frame is different from the resolution of the to-be-encoded video frame, the location information of the code block or the location information of the decoded block may be transformed according to the resolution information of the current reference frame and the to-be-encoded video frame, so that the location information corresponding to the to-be-encoded video frame and the location information corresponding to the current reference frame are under the same quantization scale. The target motion vector is obtained according to the transformed location information to reduce the value of the target motion vector and reduce the data amount of the encoded data. Alternatively, if the resolution information corresponding to the target motion vector is different from the resolution information of the to-be-encoded video frame, when the first motion vector corresponding to the code block of the to-be-encoded video frame is calculated under the resolution of the to-be-encoded video frame, the first motion vector is transformed according to the resolution information of the to-be-encoded video frame and the target motion vector unit resolution information to obtain the target motion vector under the target resolution. For example, it is assumed that the resolution of the to-be-encoded video frame is 400*800 pixels, and the resolution of the current reference frame is 800*1600 pixels. In this case, 1/2 downsampling may be performed on the current reference frame according to the resolution of the to-be-encoded video frame to obtain that the resolution of the target reference frame of 400*800 pixels, and then video encoding is performed according to the target reference frame.

In this embodiment, a resolution determining manner of a current reference frame is determined according to a resolution relationship between a to-be-encoded video frame and a corresponding reference frame, so that the current reference frame matching a resolution of the to-be-encoded video frame can be flexibly selected according to the resolution determining manner of the reference frame. That is, the current reference frame may still be used as a reference frame of the to-be-encoded video frame even if the current reference frame has a resolution different from that of the to-be-encoded video frame, thereby improving the use efficiency of the reference frame. The to-be-encoded video frame is encoded according to the current reference frame. By flexibly selecting the current reference frame having the matching resolution, the accuracy of encoding is improved, thereby improving the encoding quality of the video frame and the encoding efficiency.

Figure 6:
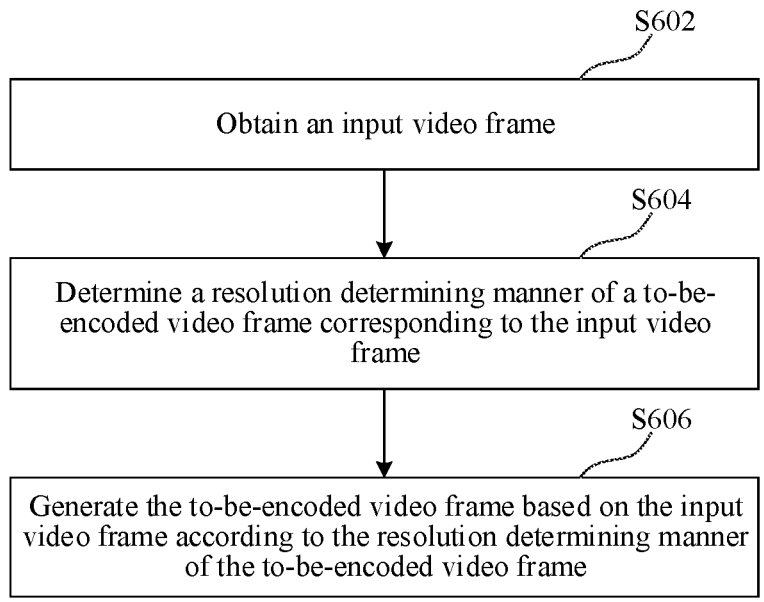
FIG. 6 is a flowchart of steps of generating a to-be-encoded video frame according to an embodiment.

FIG. 6 is a flowchart of the step S502 of generating the to-be-encoded video frame.

In S602, the method may include obtaining an input video frame.

A video frame is a basic unit forming a video, and one video sequence may include a plurality of input video frames. The input video frame may be a video frame acquired in real time, for example, a video frame obtained in real time through a camera of a terminal, or may be a video frame corresponding to a video sequence stored in advance. An encoded frame prediction type corresponding to the input video frame may be determined according to an encoding algorithm. The encoded frame prediction type may include an I frame, a P frame, or a B frame, where the I frame is an intra-predicted frame, the P frame is a forward predicted frame, and the B frame is a bi-directional predicted frame. Code blocks of the P frame and the B frame may be encoded by using an intra-frame prediction or an inter-frame prediction.

In an embodiment, the server receives a video frame sequence, and obtains an input video frame from the video frame sequence. Alternatively, the server receives a video frame sequence in a video frame group, and obtains an input video frame from the video frame group.

In S604, the method may include determining the resolution determining manner (or method) of the to-be-encoded video frame corresponding to the input video frame.

The resolution determining manner of the to-be-encoded video frame corresponding to the input video frame is selected from candidate processing manners. The candidate processing manners may include a full-resolution processing and a downsampling processing. A method for obtaining the processing manner of the to-be-encoded video frame corresponding to the input video frame may be set according to an actual requirement. For example, a processing parameter corresponding to the input video frame may be obtained, and the corresponding processing manner is obtained according to the processing parameter. The processing parameter is a parameter for determining a processing manner, and a specific processing parameter may be predetermined. For example, the processing parameter may include at least one of current encoding information and an image feature corresponding to the input video frame.

In an embodiment, when the processing manner corresponding to the input video frame includes a downsampling processing, a downsampling ratio and a downsampling method may further be obtained. The sampling ratio is a ratio obtained by dividing a resolution after the sampling by a resolution before the sampling. The downsampling method may use direct averaging, a filter, bicubic interpolation, bilinear interpolation, or the like. The downsampling ratio may be preset, or the downsampling ratio may be flexibly adjusted. For example, it may be preset that all downsampling ratios are 1/2. Also, the downsampling ratio may be set so that a downsampling ratio of the first input video frame of an input video sequence is 1/2, and a downsampling ratio of the second input video frame is 1/4. The downsampling ratio may be obtained according to an encoding location of the input video frame in a GOP, where a later encoding location corresponds to a smaller downsampling ratio. A downsampling direction may be one of vertical downsampling, horizontal downsampling, and a combination of vertical and horizontal downsampling. If a video frame resolution before sampling is 800*800 pixels, when the downsampling ratio is 1/2 and horizontal downsampling is performed, a video frame resolution after sampling is 400*800 pixels. When the downsampling ratio is 1/2 and vertical downsampling is performed, a video frame resolution after sampling is 800*400 pixels.

In an embodiment, the downsampling ratio may be obtained according to a processor capacity of a device, such as a terminal or a server performing the video encoding method. A device with a high processor processing capacity corresponds to a large downsampling ratio, and a device with a low processor processing capacity corresponds to a small downsampling ratio. A correspondence between processor processing capacities and downsampling ratios may be set. That is, when encoding needs to be performed, a processor processing capacity is obtained, and a corresponding downsampling ratio is obtained according to the processor processing capacity. For example, it may be specified that a downsampling ratio corresponding to a 16-bit processor is 1/8, and a downsampling ratio corresponding to a 32-bit processor is 1/4.

In an embodiment, the downsampling ratio may be obtained according to the frequency or the number of times of the input video frame being used as a reference frame, and a correspondence between the downsampling ratio and the frequency or the number of times of the input video frame being used as a reference frame may be set. A higher frequency or a larger number of times of the input video frame being used as a reference frame corresponds to a larger downsampling ratio. A lower frequency or a smaller number of times of the input video frame being used as a reference frame corresponds to a smaller downsampling ratio. For example, if the frequency of an I frame being used as a reference frame is high, the corresponding downsampling ratio may be large, for example, 1/2. If the frequency of a P frame being used as a reference frame is low, the corresponding downsampling ratio may be small, for example, 1/4. The downsampling ratio is obtained according to the frequency or the number of times of the input video frame being used as a reference frame, and when the input video frame is used as a reference frame frequently or for a large number of times, the image quality is better. Therefore, the accuracy of prediction can be improved, thereby reducing a prediction residual and improving the quality of an encoded image.

In an embodiment, the downsampling method may be obtained according to a processor capacity of a device, such as a terminal or a server, performing the video encoding method. A device with a high processor processing capacity corresponds to a high-complexity downsampling method, and a device with a low processor processing capacity corresponds to a low-complexity downsampling method. A correspondence between processor processing capacities and downsampling methods may be set. When encoding needs to be performed, a processor processing capacity is obtained, and a corresponding downsampling method is obtained according to the processor processing capacity. For example, bicubic interpolation is more complex than bilinear interpolation. Therefore, it may be specified that a downsampling method corresponding to the 16-bit processor is bilinear interpolation, and a downsampling method corresponding to the 32-bit processor is bicubic interpolation.

In this embodiment, when the input video frame is processed in a downsampling processing manner, downsampling may be performed according to different downsampling methods or downsampling ratios, and the processing for the input video frame is more flexible.

In an embodiment, the processing manner corresponding to the input video frame may be obtained according to at least one of current encoding information and image feature information corresponding to the input video frame. The current encoding information refers to video compression parameter information of the video during encoding, for example, one or more of a frame prediction type, a motion vector, a quantization parameter, a video source, a bit rate, a frame rate, and a resolution. The image feature information refers to information related to image content, and includes one or more of image motion information and image texture information, such as an edge. The current encoding information and/or the image feature information reflect a scenario, detail complexity, motion intensity, or the like that correspond to a video frame. For example, a motion scenario may be determined by using one or more of a motion vector, a quantization parameter, or a bit rate. A large quantization parameter may indicate high motion intensity, and a large motion vector may indicate that an image scenario is a large motion scenario. Determining may alternatively be performed according to a ratio of a bit rate of an encoded I frame to that of an encoded P frame or a ratio of a bit rate of an encoded I frame to that of an encoded B frame. If the ratio exceeds a first preset threshold, it is determined that an image is a still image, and if the ratio is less than a second preset threshold, it may be determined that an image is an image with high motion intensity. Alternatively, a target object is directly tracked according to image content, and whether a scenario is a large motion scenario is determined according to a motion speed of the target object. At a fixed bit rate, a fixed amount of information can be expressed. For a scenario with high motion intensity, the amount of time-domain information is large, and accordingly, a smaller bit rate may be used for expressing space-domain information. Therefore, a relatively good image quality effect can be achieved by using a low resolution, and it is more inclined to select a downsampling mode for encoding. An image switching scenario may be determined according to the frame prediction type, and an encoding mode may also be determined according to influence of the frame prediction type on other frames. For example, an I frame is usually the first frame or exists in image switching, and quality of the I frame affects quality of a subsequent P frame or B frame. Therefore, it is more inclined to select a full-resolution processing manner for an intra-predicted frame than an inter-predicted frame to ensure image quality. The P frame may be used as a reference frame of the B frame, and image quality of the P frame affects image quality of the subsequent B frame. Therefore, it is more inclined to select a full-resolution processing manner if the P frame is used for encoding, compared with a case of using the B frame for encoding. Texture complexity of the to-be-encoded video frame is determined according to the image feature information, for example, image texture information. If texture is complex and includes a large number of details, the image has a large amount of space-domain information. If downsampling is performed, a relatively large amount of detail information may be lost due to the downsampling, and video quality is affected. Therefore, it is more inclined to select full-resolution processing for a to-be-encoded video frame having a complex texture than for a to-be-encoded video frame having a simple texture.

In an embodiment, the resolution corresponding to the input video frame may be obtained according to a relationship between values of a current quantization parameter corresponding to the input video frame and a quantization parameter threshold. If the current quantization parameter is greater than the quantization parameter threshold, it is determined that the processing manner is a downsampling manner. Alternatively, it may be determined that the processing manner is a full-resolution processing manner. The quantization parameter threshold may be obtained according to a proportion of intra-blocks in a forward encoded video frame that has been encoded before the input video frame. A correspondence between intra-frame prediction block proportion and quantization parameter thresholds may be set in advance, so that after an intra-frame prediction block proportion in the current frame is determined, a quantization parameter threshold corresponding to the intra-frame prediction block proportion in the current frame may be determined according to the correspondence. For encoding with a fixed quantization parameter, the current quantization parameter may be a corresponding fixed quantization parameter value. For encoding with a fixed bit rate, the current quantization parameter corresponding to the input video frame may be obtained through calculation according to a bit rate control model. Alternatively, a quantization parameter corresponding to the reference frame may be used as the current quantization parameter corresponding to the input video frame. In this embodiment, a large current quantization parameter usually indicates higher motion intensity, and it is more inclined to select the downsampling processing manner for a scenario having higher motion intensity.

In an embodiment, an intra-frame prediction block proportion is in a positive correlation with the quantization parameter threshold. For example, it may be determined in advance that a correspondence between the intra-frame prediction block proportion $Intra_0$ and the quantization parameter threshold $QP_{TH}$ is as follows:

$$QP_{TH} = \begin{cases} 33, & Intra_0 < 10\% \\ 31, & 10\% \le Intra_0 < 50\% \\ 29, & Intra_0 \ge 50\% \end{cases} \quad \text{(Eq. 1)}$$

In S606, the method may include generating the to-be-encoded video frame based on the input video frame according to the resolution determining manner of the to-be-encoded video frame.

The to-be-encoded video frame is obtained after the input video frame is processed according to the resolution determining manner. When the resolution determining manner includes a full-resolution processing manner, the input video frame may be used as the to-be-encoded video frame. When the resolution determining manner (procedure or process) includes a downsampling processing, the input video frame may be downsampled to obtain the to-be-encoded video frame. For example, when a resolution of the input video frame is 800*800 pixels and the processing manner is 1/2 downsampling in both a horizontal direction and a vertical direction, a resolution of the to-be-encoded video frame obtained after downsampling is 400*400 pixels.

In this embodiment, after the input video frame is obtained, resolution processing is performed on the input video frame according to the resolution determining manner of the to-be-encoded video frame corresponding to the input video frame, to generate the to-be-encoded video frame. The resolution determining manner of the to-be-encoded video frame may be configured flexibly, the data amount in the process of encoding the input video frame may be reduced, thereby improving the video encoding efficiency.

Figure 7:
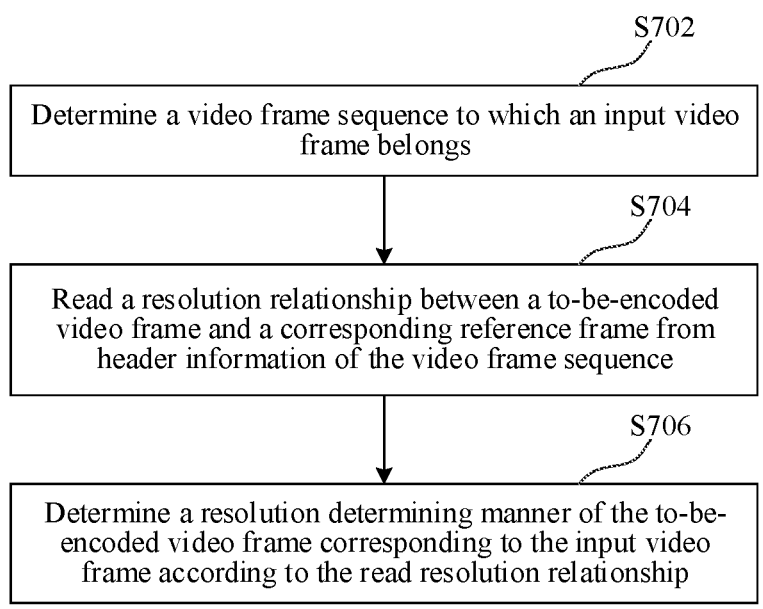
FIG. 7 is a flowchart of steps of determining a resolution determining manner according to an embodiment.

FIG. 7 is a flowchart of the step S604 of determining the resolution determining manner according to an embodiment.

In S702, the method may include determining a video frame sequence to which the input video frame belongs.

The video frame sequence is a frame sequence including a plurality of video frame groups or a plurality of input video frames. The video frame group is a frame group including a plurality of consecutive input video frames.

After obtaining the input video frame, the server determines, according to a correspondence between input video frames and video frame sequences, the video frame sequence to which the input video frame belongs.

In S704, the method may include obtaining the resolution relationship between the to-be-encoded video frame and the corresponding reference frame from header information of the video frame sequence.

The header information of the video frame sequence includes the resolution relationship between the to-be-encoded video frame and the corresponding reference frame. After determining the video frame sequence to which the input video frame belongs, the server queries the header information of the video frame sequence, and extracts the resolution relationship between the to-be-encoded video frame and the corresponding reference frame from the queried header information.

In an embodiment, S704 may include the following content: obtaining, in a case that the resolution relationship exists in sequence header information of the video frame sequence, the resolution relationship between the to-be-encoded video frame and the corresponding reference frame from the sequence header information, an application range of the resolution relationship being a frame sequence range; and obtaining, in a case that the resolution relationship does not exist in the sequence header information of the video frame sequence, the resolution relationship between the to-be-encoded video frame and the corresponding reference frame from video frame group header information of the video frame sequence, an application range of the resolution relationship being a frame group range.

The header information of the video frame sequence includes the sequence header information and the video frame group header information. The server first queries the resolution relationship in the sequence header information of the video frame sequence. When the resolution relationship exists in the sequence header information, the server obtains the resolution relationship between the to-be-encoded video frame and the corresponding reference frame from the sequence header information; when the resolution relationship does not exist in the sequence header information, the server obtains a video frame group in the video frame sequence and video frame group header information of the video frame group to determine the resolution relationship between the to-be-encoded video frame and the corresponding reference frame from the video frame group header information. Alternatively, the resolution relationship between the to-be-encoded video frame and the corresponding reference frame may be obtained from frame header information of the input video frame.

In S706, the method may include determining the resolution determining manner of the to-be-encoded video frame corresponding to the input video frame according to the obtained resolution relationship.

The resolution relationship obtained by the server is the resolution relationship between the to-be-encoded video frame and the corresponding reference frame. The server extracts the resolution information of the to-be-encoded video frame from the resolution relationship between the obtained to-be-encoded video frame and the reference frame corresponding to the to-be-encoded video frame, and determines the resolution determining manner of the current reference frame according to the extracted resolution information of the to-be-encoded video frame.

For example, if the resolution information of the to-be-encoded video frame extracted by the server is a down-sampled-resolution to-be-encoded video frame, the resolution determining manner of the current reference frame is a downsampling determining manner. If the resolution information of the reference frame extracted by the server is an original-resolution reference frame, the resolution determining manner of the to-be-encoded video frame is an original-resolution determining manner.

In this embodiment, the resolution relationship between the to-be-encoded video frame and the corresponding reference frame is obtained according to the sequence frame header information or the video frame header information, and the resolution determining manner of the to-be-encoded video frame is determined according to the resolution information of the to-be-encoded video frame in the read resolution relationship, so that the to-be-encoded video frame is generated according to the determined resolution determining manner, thereby improving the video encoding efficiency.

Figure 8:
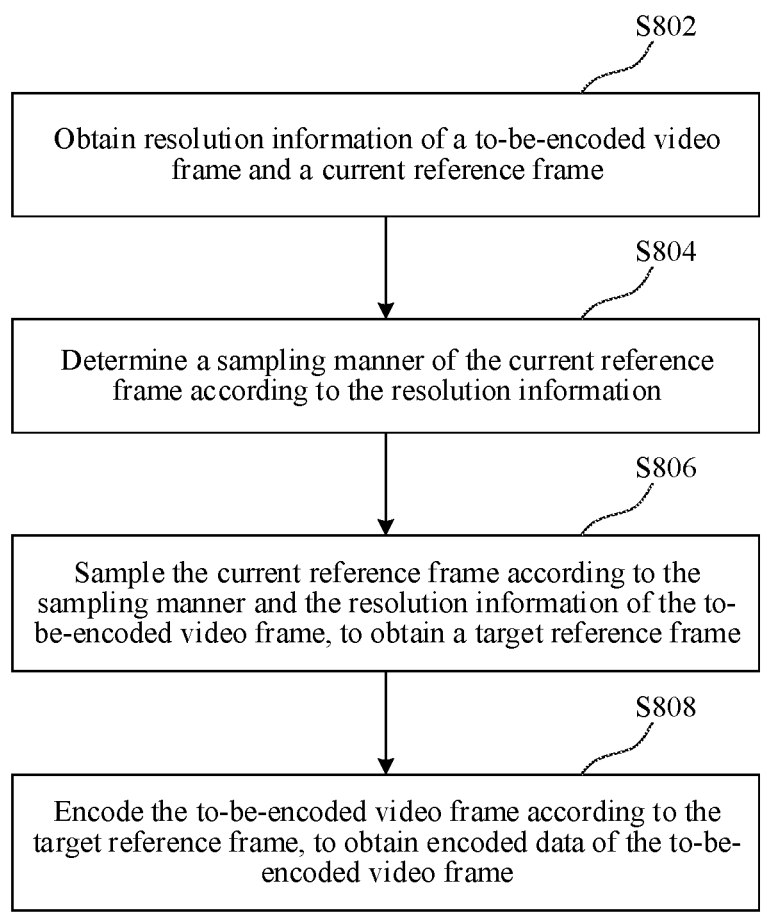
FIG. 8 is a flowchart of steps of encoding according to a reference frame according to an embodiment.

FIG. 8 is a flowchart illustrating the step S508 of encoding according to the reference frame according to an embodiment.

In S802, the method may include obtaining resolution information of the to-be-encoded video frame and the current reference frame.

The resolution information is information representing a resolution value.

After obtaining the to-be-encoded video frame and the current reference frame, the server extracts the resolution information of the to-be-encoded video frame and the resolution information of the current reference frame respectively.

In S804, the method may include determining a sampling manner of the current reference frame according to the resolution information.

The sampling manner is a manner for sampling the video frame, and may include a sampling ratio and/or a sampling method or mechanism. In this embodiment, the sampling manner may be a sampling manner for sampling the current reference frame. The sampling the current reference frame includes upsampling or downsampling the current reference frame.

In addition, the server compares a resolution indicated by the resolution information of the to-be-encoded video frame with a resolution indicated by the resolution information of the current reference frame. The server determines that the sampling manner of the current reference frame is a down-sampling processing manner when the resolution of the to-be-encoded video frame is greater than the resolution of the current reference frame. The server determines that the sampling manner of the current reference frame is an upsampling processing manner when the resolution of the to-be-encoded video frame is less than the resolution of the current reference frame.

In an embodiment, there may be a plurality of sampling methods or mechanisms, for example, bilinear interpolation, bicubic interpolation, a convolutional neural network (CNN)-based algorithm, or a method based on statistical characteristics. For example, in a case that the CNN-based algorithm is used, when the current reference frame needs to be upsampled, upsampling may be performed by using a super-resolution reconstruction model (such as a super-resolution CNN model) to reconstruct the current reference frame. In a case that the method based on the statistical characteristics is used, a nearest neighbor interpolation method, a mean interpolation method, a median interpolation method, or the like may be used.

In an embodiment, the encoder side and the decoder side may agree on a fixed sampling method, and the current reference frame is sampled according to the agreed sampling method. In an embodiment, the encoder side may alternatively select an appropriate sampling method from a plurality of preset sampling methods as a sampling manner corresponding to the current to-be-encoded video frame.

In an embodiment, the encoder side or the decoder side may determine the sampling manner corresponding to the to-be-encoded video frame according to local hardware information of a device that performs the video encoding method and/or image feature information of the to-be-encoded video frame. The local hardware information is information related to hardware of a computer device that performs the video encoding/video decoding method, and may include related information about a central processing unit (CPU), a memory, a mainboard, a drive, or the like.

In an embodiment, the method for sampling the current reference frame may be obtained according to a processor capacity of a device, such as a terminal or a server, performing the video encoding or video decoding method. A device with a high processor processing capacity corresponds to a high-complexity sampling method, and a device with a low processor processing capacity corresponds to a low-complexity sampling method. A correspondence between processor processing capacities and sampling methods may be set. When encoding needs to be performed, a processor processing capacity is obtained, and a corresponding sampling method is obtained according to the processor processing capacity. For example, it may be specified that a sampling ratio corresponding to a 16-bit processor is 1/8, and a downsampling ratio corresponding to a 32-bit processor is 1/4. For example, bicubic interpolation is more complex than bilinear interpolation. Therefore, it may be specified that a downsampling method corresponding to the 16-bit processor is bilinear interpolation, and a downsampling method corresponding to the 32-bit processor is bicubic interpolation.

In an embodiment, the method for sampling the current reference frame may alternatively be determined according to image feature information of the to-be-encoded video frame or the to-be-decoded video frame. The image feature information refers to information related to image content of the video frame, and includes image content, image motion information, and image texture information, such as an edge. The image feature information reflects a scenario corresponding to the video frame, detail complexity, motion intensity, and the like. For a video frame having a large amount of complex image feature information, a sampling method with high sampling method complexity may be selected during sampling of the current reference frame. For a video frame having a small amount of simple image feature information, a sampling method with low sampling method complexity may be selected during sampling of the current reference frame. A correspondence between content of a to-be-encoded video frame and a sampling method may be preset. When a video frame is to be encoded, image feature information of the to-be-encoded video frame may be determined in advance, and a corresponding sampling method is obtained according to the image feature information of the to-be-encoded video frame.

In an embodiment, during determining of the sampling manner for sampling the current reference frame, hardware information of the encoder side or the decoder side and the image feature information may be considered in combination, to select a most appropriate current sampling manner.

In an embodiment, the video encoding method further includes adding, to the encoded data, identification information representing the resolution relationship between the to-be-encoded video frame and the reference frame.

In addition, the encoder side adds, to the encoded data, the identification information representing the resolution relationship between the to-be-encoded video frame and the reference frame. The identification information may be added to header information corresponding to the encoded data. For example, the identification information may be added to a preset position of frame header information, video frame group header information, or sequence header information. The frame header information is header information of encoded data corresponding to an input frame, the video frame group header information refers to header information of encoded data corresponding to a video frame group, and the sequence header information refers to header information of encoded data corresponding to a video frame sequence. One video frame sequence may include a plurality of video frame groups, and one video frame group may include a plurality of consecutive video frames. The identification information may be added to header information of different ranges according to actual requirements to identify video frames of different ranges. If all video frame groups of the video frame sequence use the same resolution determining manner, the adding position of the identification information in the encoded data may be the sequence header information. If the video frame groups of the video frame sequence use different resolution determining manners, the adding position of the identification information in the encoded data may be the video frame group header information.

Figure 9:
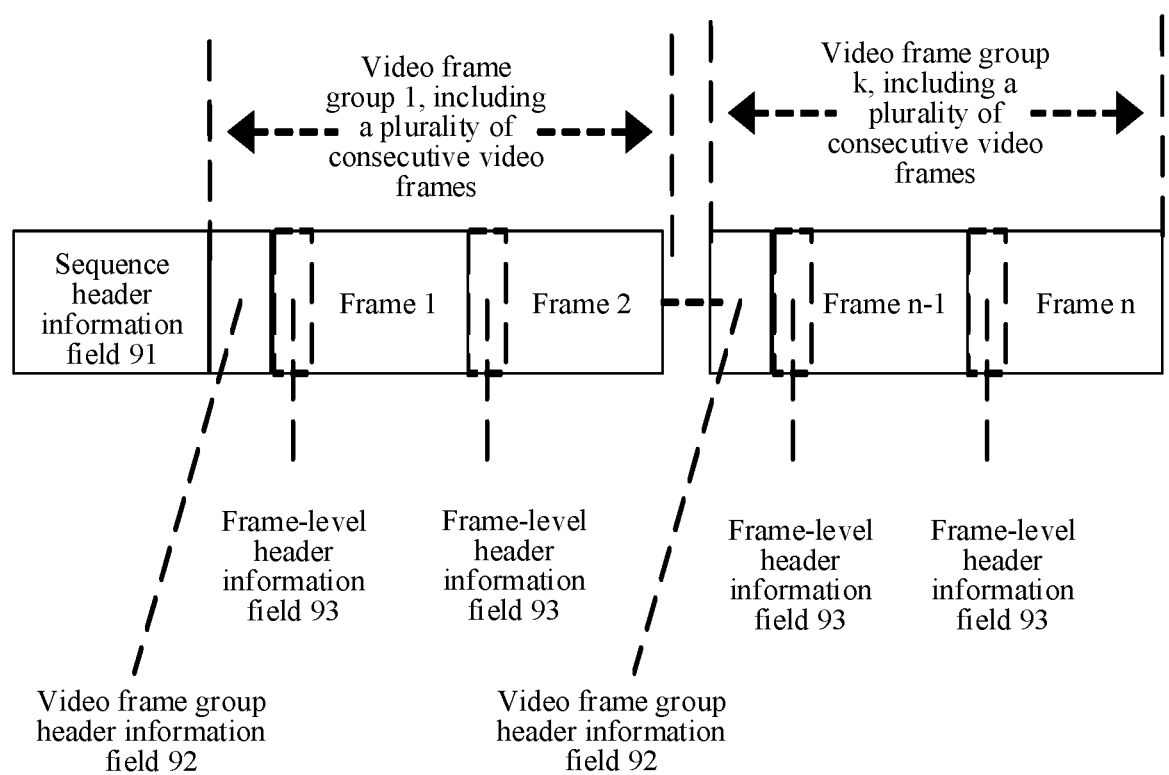
FIG. 9 is a structural block diagram of a video frame sequence according to an embodiment.

FIG. 9 is a structural block diagram of a video frame sequence according to an embodiment. Blocks indicated by dashed lines in FIG. 9 represent header information of encoded data corresponding to each input video frame; frames represent encoded data corresponding to the first video frame, the second video frame, and an $nt^h$ video frame respectively. It can be learned from FIG. 9 that, the encoder side may add the identification information representing the resolution relationship to header information corresponding to the encoded data as a header information field, for example, a sequence header information field 91, a video frame group header information field 92, and a frame-level header information field 93.

In an embodiment, a flag Sequence Resolution Referencer Rules of the identification information representing the resolution relationship between the to-be-encoded video frame and the reference frame may be added to the encoded data. A value of the flag corresponding to each piece of identification information may be set according to a requirement. For example, when the resolution relationship between the to-be-encoded video frame and the reference frame is that an original-resolution to-be-encoded video frame is referenced to an original-resolution reference frame, the corresponding flag is 0. When the resolution relationship between the to-be-encoded video frame and the reference frame is that an original-resolution to-be-encoded video frame is referenced to a downsampled-resolution reference frame, the corresponding flag is 1. When the resolution relationship between the to-be-encoded video frame and the reference frame is that a downsampled-resolution to-be-encoded video frame is referenced to an original-resolution reference frame, the corresponding flag is 2. When the resolution relationship between the to-be-encoded video frame and the reference frame is that a downsampled-resolution to-be-encoded video frame is referenced to a downsampled-resolution reference frame, the corresponding flag is 3.

In S806, the method may include sampling the current reference frame according to the sampling manner and the resolution information of the to-be-encoded video frame to obtain a target reference frame.

After determining the sampling manner of the current reference frame, the server samples the current reference frame according to the determined sampling manner, so that the resolution of the target reference frame obtained after sampling is the same as the resolution indicated by the resolution information of the to-be-encoded video frame.

In an embodiment, the upsampling processing is scaling up an image by using, for example, an interpolation method, where based on original image pixels, new elements are inserted between pixel points by using an appropriate interpolation algorithm. That is, the resolution indicated by the resolution information of the to-be-encoded video frame being greater than the resolution indicated by the resolution information of the current reference frame may mean that a to-be-encoded video frame in a full-resolution manner is referenced to a current reference frame processed in a downsampling manner. Alternatively, a to-be-encoded video frame processed in a downsampling manner is referenced to a current reference frame processed in a downsampling manner, and a downsampling ratio of the to-be-encoded video frame is greater than a downsampling ratio of the current reference frame.

In an embodiment, the determining a sampling manner configured corresponding to the to-be-encoded video frame includes determining, according to local hardware information and/or image feature information of the to-be-encoded video frame, a sampling manner for upsampling the current reference frame.

In an embodiment, the current reference frame is upsampled in a case that the resolution indicated by the resolution information of the to-be-encoded video frame is greater than the resolution indicated by the resolution information of the current reference frame. A sampling manner for upsampling the current reference frame may be determined according to the local hardware information and/or the image feature information of the to-be-encoded video frame. For example, a device with a high processor processing capacity corresponds to a high-complexity upsampling method, and a device with a low processor processing capacity corresponds to a low-complexity upsampling method. As another example, for a video frame having a large amount of complex image feature information, a sampling method with high sampling method complexity may be selected during upsampling of the current reference frame. For a video frame having a small amount of simple image feature information, a sampling method with low sampling method complexity may be selected during upsampling of the current reference frame. Alternatively, the local hardware information of the device that performs video encoding and image features of the to-be-encoded video frame may be considered in combination, to select a most appropriate current upsampling manner.

In an embodiment, the current reference frame is upsampled in a case that the resolution indicated by the resolution information of the to-be-encoded video frame is greater than the resolution indicated by the resolution information of the current reference frame. The current reference frame may be upsampled based on the configured sampling manner according to the resolution information of the to-be-encoded video frame, to obtain a target reference frame having a resolution consistent with that of the to-be-encoded video frame.

In an embodiment, in a case that the resolution indicated by the resolution information of the to-be-encoded video frame is less than the resolution indicated by the resolution information of the current reference frame, the current reference frame is downsampled based on the sampling manner according to the resolution information of the to-be-encoded video frame to obtain the corresponding target reference frame.

The downsampling processing is scaling down an image. For example, by performing 1/a downsampling on an image I having a size of M*N, a resolution image having a size of (M/a)*(N/a) is obtained, where a is a common divisor of M and N. In a case of a rectangular image, the downsampling processing is changing an image in an s*s window of an original image to be one pixel, and a value of the pixel point is a mean value of all pixels in the window. That the resolution indicated by the resolution information of the to-be-encoded video frame is less than the resolution indicated by the resolution information of the current reference frame may be that a to-be-encoded video frame processed in a downsampling manner is referenced to a current reference frame in a full-resolution manner. Alternatively, a to-be-encoded video frame processed in a downsampling manner is referenced to a current reference frame processed in a downsampling manner, and a downsampling ratio of the to-be-encoded video frame is less than a downsampling ratio of the current reference frame.

For example, it is assumed that the resolution of the to-be-encoded video frame is 400*800 pixels, and the resolution of the current reference frame is 800*1600 pixels. In this case, the current reference frame may be downsampled according to the resolution of the to-be-encoded video frame to obtain a corresponding target reference frame, and then video encoding is performed according to the target reference frame. For example, 1/2 downsampling is performed on a width and a height of the current reference frame, to obtain the target reference frame with a resolution of 400*800 pixels.

In an embodiment, the current reference frame is downsampled in a case that the resolution indicated by the resolution information of the to-be-encoded video frame is less than the resolution indicated by the resolution information of the current reference frame. Accordingly, the current reference frame may be downsampled according to a downsampling method corresponding to the resolution of the to-be-encoded video frame to obtain a target reference frame having a resolution consistent with that of the to-be-encoded video frame.

In an embodiment, the current reference frame may not be downsampled in a case that the resolution indicated by the resolution information of the to-be-encoded video frame is less than the resolution indicated by the resolution information of the current reference frame. Sub-pixel interpolation processing is directly performed on the current reference frame, to obtain the target reference frame.

In an embodiment, the current reference frame may not be sampled in a case that the resolution indicated by the resolution information of the to-be-encoded video frame is equal to the resolution indicated by the resolution information of the current reference frame. Sub-pixel interpolation processing is directly performed on the current reference frame, to obtain the target reference frame.

In an embodiment, the step of sampling the current reference frame based on the sampling manner according to resolution information of the to-be-encoded video frame to obtain a corresponding target reference frame includes: determining, according to the resolution information of the to-be-encoded video frame and resolution information of the current reference frame, a sampling ratio corresponding to the sampling of the current reference frame; and sampling the current reference frame according to the sampling manner and the sampling ratio, to obtain the corresponding target reference frame.

Here, the encoder side may obtain the resolution information of the to-be-encoded video frame and the resolution information of the current reference frame. The sampling ratio corresponding to the sampling of the current reference frame is determined according to the resolution information of the to-be-encoded video frame and the resolution information of the current reference frame. The sampling ratio corresponding to the sampling of the current reference frame needs to meet the following condition: a target reference frame is obtained after the current reference frame is sampled, and a resolution of the target reference frame is kept consistent with that of the to-be-encoded video frame.

In an embodiment, when a to-be-encoded video frame in a full-resolution manner is referenced to a current reference frame processed in a downsampling manner, an upsampling ratio for upsampling and reconstruction of the current reference frame may be a reciprocal of a downsampling ratio corresponding to the current reference frame processed in the downsampling manner. An upsampling direction may be one of vertical upsampling, horizontal upsampling, or vertical and horizontal upsampling.

In an embodiment, when a to-be-encoded video frame processed in a downsampling manner is referenced to a current reference frame processed in a downsampling manner, and a downsampling ratio of the to-be-encoded video frame is greater than a downsampling ratio of the current reference frame, an upsampling ratio for upsampling and reconstruction of the current reference frame needs to meet a condition that a resolution of a target reference frame obtained after the upsampling and reconstruction is kept consistent with a resolution of the to-be-encoded video frame. For example, a resolution of a video frame in a full-resolution manner is 12M*12N, a resolution of a to-be-encoded video frame processed in a 1/2 downsampling manner is 6M*6N, and a resolution of a current reference frame processed in a 1/6 downsampling manner is 2M*2N. In this case, 3× upsampling may be performed on the current reference frame to obtain a target reference frame, where the target reference frame has a resolution of 6M*6N.

In an embodiment, when a to-be-encoded video frame processed in a downsampling manner is referenced to a current reference frame in a full-resolution manner, a downsampling ratio for downsampling and reconstruction of the current reference frame may be a downsampling ratio corresponding to the to-be-encoded video frame processed in the downsampling manner. A downsampling direction may be one of vertical downsampling, horizontal downsampling, and vertical and horizontal downsampling.

In an embodiment, when a to-be-encoded video frame processed in a downsampling manner is referenced to a current reference frame processed in a downsampling manner, and a downsampling ratio of the to-be-encoded video frame is less than a downsampling ratio of the current reference frame, a downsampling ratio for downsampling and reconstruction of the current reference frame needs to meet a condition that a resolution of a target reference frame obtained after the downsampling and reconstruction is kept consistent with a resolution of the to-be-encoded video frame. For example, a resolution of a video frame in a full-resolution manner is 12M*12N, a resolution of a to-be-encoded video frame processed in a 1/6 downsampling manner is 2M*2N, and a resolution of a current reference frame processed in a 1/2 downsampling manner is 6M*6N. In this case, 1/3 downsampling may be performed on the current reference frame to obtain a target reference frame, where the target reference frame has a resolution of 2M*2N.

In an embodiment, the encoder side may further add, to the encoded data corresponding to the input video frame, sampling ratio information corresponding to the sampling ratio. During decoding, the decoder side may obtain the corresponding sampling ratio information in the encoded data, to determine the sampling ratio for sampling the current reference frame.

The sampling ratio information is used for describing a sampling ratio for sampling the current reference frame, and a flag Sampling_Scale for indicating that the sampling ratio information may be added to the encoded data. A value of the flag may be set according to a requirement. An adding position of the sampling ratio information in the encoded data may be in any one of frame header information, video frame group header information, or sequence header information. The adding position of the sampling ratio information in the encoded data may be determined according to an action range of the sampling. The sampling ratio information may be determined according to the resolution information of the to-be-encoded video frame and the resolution information of the current reference frame.

In the foregoing embodiment, the sampling ratio corresponding to the sampling of the current reference frame is determined according to the resolution information of the to-be-encoded video frame and the resolution information of the current reference frame, and then the current reference frame is sampled according to the determined sampling ratio, so that an appropriate target reference frame can be obtained, for example, a target reference frame having a resolution consistent with that of the to-be-encoded video frame, thereby facilitating subsequent video encoding.

In S806, the method may include sampling the current reference frame based on the sampling manner according to the resolution information of the to-be-encoded video frame to obtain an intermediate reference frame; and performing sub-pixel interpolation processing on the intermediate reference frame to obtain the target reference frame.

Sub-pixel interpolation is a process of obtaining sub-pixel-level reference data through interpolation by using integer-pixel reference data in the intermediate reference frame. The encoder side samples the current reference frame based on the determined sampling manner according to the resolution information of the to-be-encoded video frame to obtain an intermediate reference frame, and may directly use the intermediate reference frame as the target reference frame.

In an embodiment, the encoder side may sample the current reference frame based on the determined sampling manner according to the resolution information of the to-be-encoded video frame to obtain an intermediate reference frame. Sub-pixel interpolation processing is performed on the intermediate reference frame to obtain the target reference frame.

In an embodiment, the encoder side may specify, in the respective encoding/decoding rule, a sub-pixel interpolation manner for processing the intermediate reference frame to obtain the target reference frame. During encoding/decoding, the sub-pixel interpolation manner corresponding to processing of the intermediate reference frame is determined according to the configuration. Here, sub-pixel interpolation manners used by the encoder side and the decoder side need to be consistent.

In an embodiment, when the input video frame is encoded by using an adaptive-resolution encoding framework, sub-pixel interpolation manner information corresponding to the sub-pixel interpolation manner may be added to the encoded data corresponding to the input video frame. An adding position of the sub-pixel interpolation manner information in the encoded data may be any one of corresponding sequence header information, video frame group header information, or frame header information. The adding position of the sub-pixel interpolation manner information in the encoded data may be determined according to an action range corresponding to the sub-pixel interpolation manner. The sub-pixel interpolation manner information may be added to the frame header information of the encoded data corresponding to the input video frame, indicating that when the input video frame is encoded, sub-pixel interpolation processing is performed on the corresponding current reference frame by using the sub-pixel interpolation manner corresponding to the sub-pixel interpolation manner information. For example, when a flag Pixel Sourse Interpolation used for determining the sub-pixel interpolation manner in the frame header information of the encoded data is 0, it indicates that sub-pixel interpolation processing is directly performed on the current reference frame corresponding to the input video frame. Further, when Pixel Sourse Interpolation is 1, it indicates that the current reference frame corresponding to the input video frame is sampled, and then sub-pixel interpolation processing is performed. The decoder side may perform sub-pixel interpolation processing on the current reference frame according to the sub-pixel interpolation manner indicated by the Pixel Source Interpolation flag in the encoded data to obtain the target reference frame, so that a reconstructed video frame may be obtained by decoding the encoded data according to the target reference frame.

In the foregoing embodiment, the current reference frame is sampled to obtain an intermediate reference frame, and then sub-pixel interpolation processing is performed on the intermediate reference frame to obtain the target reference frame. Sub-pixel interpolation processing is performed on the intermediate reference frame to further improve a degree of image matching between the to-be-encoded video frame and a frame to be referenced to, thereby improving the pixel precision of motion estimation, reducing a prediction residual, and improving the quality of an encoded image.

In an embodiment, the step of sampling the current reference frame based on the sampling manner according to resolution information of the to-be-encoded video frame to obtain a corresponding target reference frame includes: sampling the current reference frame based on the sampling manner according to the resolution information of the to-be-encoded video frame and motion estimation pixel precision to obtain the corresponding target reference frame.

The motion estimation pixel precision is a unit length of a motion vector corresponding to each code block in the to-be-encoded video frame. When encoding the code block in the to-be-encoded video frame, the encoder side may refine the unit length of the motion vector corresponding to the code block according to the obtained motion estimation pixel precision, so that the obtained motion vector is more accurate. Therefore, the current reference frame needs to be sampled according to the obtained motion estimation pixel precision to obtain the target reference frame. Then, a first motion vector corresponding to each code block in the to-be-encoded video frame is calculated according to the target reference frame, and encoding is performed based on the first motion vector to obtain the encoded data corresponding to the to-be-encoded video frame.

The resolution information of the current reference frame may be obtained. A sampling method for the current reference frame, a sampling ratio corresponding to the sampling, and pixel interpolation precision are determined according to the sub-pixel interpolation manner used by the to-be-encoded video frame, the resolution information of the to-be-encoded video frame, the resolution information of the current reference frame, and the motion estimation pixel precision corresponding to the to-be-encoded video frame. The value of the motion estimation pixel precision may be set according to a requirement, and may be set, for example, 1/2 pixel precision, 1/4 pixel precision, or 1/8 pixel precision.

In an embodiment, motion estimation pixel precision may be configured for the to-be-encoded video frame according to image feature information of the to-be-encoded video frame. The image feature information is, for example, a size of the to-be-encoded video frame, texture information, and a motion speed. The motion estimation pixel precision corresponding to the to-be-encoded video frame may be determined according to a combination of various image feature information. A to-be-encoded video frame carrying image data with higher complexity and richer image information corresponds to higher motion estimation pixel precision. For example, when inter-frame prediction is performed on a P frame, a motion vector corresponding to each code block in the P frame may be calculated by using higher motion estimation pixel precision; when inter-frame prediction is performed on a B frame, a motion vector corresponding to each code block in the B frame may be calculated by using lower motion estimation pixel precision.

In an embodiment, the step of sampling the current reference frame according to the resolution information of the to-be-encoded video frame and motion estimation pixel precision to obtain the corresponding target reference frame includes: calculating pixel interpolation precision according to the resolution information of the to-be-encoded video frame and the motion estimation pixel precision; and directly performing sub-pixel interpolation processing on the current reference frame according to the pixel interpolation precision to obtain the corresponding target reference frame.

The pixel interpolation precision is a pixel precision corresponding to sub-pixel interpolation performed on the current reference frame. When the sub-pixel interpolation manner is a direct sub-pixel interpolation manner, it indicates that sub-pixel interpolation processing may be directly performed on the current reference frame to obtain the target reference frame. Therefore, the pixel interpolation precision may be calculated according to the resolution information of the to-be-encoded video frame and the motion estimation pixel precision. A ratio between the resolution information of the current reference frame and the resolution information of the to-be-encoded video frame may be calculated, and the pixel interpolation precision is obtained according to the ratio and the motion estimation pixel precision.

In an embodiment, when the resolution of the current reference frame is greater than the resolution of the to-be-encoded video frame, data of some sub-pixel points in the current reference frame may be directly reused as data corresponding to sub-pixel points corresponding to the motion estimation pixel precision. That is, when the resolution of the current reference frame is greater than the resolution of the to-be-encoded video frame, it is possible to directly perform sub-pixel interpolation processing on the current reference frame without downsampling. For example, the resolution of the to-be-encoded video frame may be M*N, and the resolution of the current reference frame may be 2M*2N. If the motion estimation pixel precision is 1/2 and the pixel interpolation precision is 1, the current reference frame may be directly used as the target reference frame; if the motion estimation pixel precision is 1/4, it is obtained through calculation that the pixel interpolation precision is 1/2, and sub-pixel interpolation processing with the 1/2 pixel interpolation precision may be performed on the current reference frame to obtain the target reference frame.

In an embodiment, in a case that the resolution indicated by the resolution information of the to-be-encoded video frame is the same as the resolution of the current reference frame, sub-pixel interpolation processing is directly performed on the current reference frame according to the motion estimation pixel precision to obtain the corresponding target reference frame.

When the input video frame is processed in a full-resolution processing manner to obtain the to-be-encoded video frame and the resolution of the current reference frame is also the original resolution, the resolution of the to-be-encoded video frame is the same as the resolution of the current reference frame. When the input video frame is processed in a downsampling manner to obtain the to-be-encoded video frame and the current reference frame is also reconstructed based on encoded data that is obtained through encoding in a downsampling manner with the same sampling ratio, the resolution of the to-be-encoded video frame is the same as the resolution of the current reference frame. In this case, sub-pixel interpolation processing may be directly performed on the current reference frame based on the motion estimation pixel precision to obtain the target reference frame, and the pixel interpolation precision corresponding to the sub-pixel interpolation processing is the same as the motion estimation pixel precision.

In an embodiment, in a case that the resolution indicated by the resolution information of the to-be-encoded video frame is less than the resolution of the current reference frame, the current reference frame is downsampled according to the resolution information of the to-be-encoded video frame to obtain an intermediate reference frame, and then sub-pixel interpolation processing is performed on the intermediate reference frame based on the motion estimation pixel precision corresponding to the to-be-encoded video frame to obtain the corresponding target reference frame. For example, an input video frame having a resolution of 2M*2N is downsampled according to a downsampling processing manner to obtain a to-be-encoded video frame having a resolution of M*N, and a resolution of a current reference frame is 2M*2N (in a full-resolution processing manner). In this case, the current reference frame is downsampled according to a sampling ratio of 1/2 to obtain an intermediate reference frame having a resolution of M*N. If motion estimation pixel precision corresponding to the obtained to-be-encoded video frame is 1/2, sub-pixel interpolation processing is then performed on the intermediate reference frame according to pixel interpolation precision the same as the motion estimation pixel precision, that is, 1/2 sub-pixel interpolation precision, to obtain a target reference frame. If motion estimation pixel precision corresponding to the obtained to-be-encoded video frame is 1/4, sub-pixel interpolation processing is performed on the intermediate reference frame according to 1/4 sub-pixel interpolation precision, to obtain a target reference frame.

In an embodiment, in a case that the resolution indicated by the resolution information of the to-be-encoded video frame is greater than the resolution of the current reference frame, the current reference frame is upsampled according to the resolution information of the to-be-encoded video frame to obtain an intermediate reference frame, and then sub-pixel interpolation processing is performed on the intermediate reference frame based on the motion estimation pixel precision corresponding to the to-be-encoded video frame, to obtain the corresponding target reference frame. For example, if the resolution of the to-be-encoded video frame is 2M*2N and the resolution of the current reference frame is 1/2M*1/2N, the current reference frame needs to be upsampled according to a sampling ratio of 4 to obtain an intermediate reference frame having the same resolution as the to-be-encoded video frame. If the motion estimation pixel precision is 1/2, sub-pixel interpolation processing is continued to be performed on the obtained intermediate reference frame according to 1/2 pixel interpolation precision, to obtain the target reference frame; if the motion estimation pixel precision is 1/4, sub-pixel interpolation processing is continued to be performed on the obtained intermediate reference frame according to 1/4 pixel interpolation precision, to obtain the target reference frame.

In S808, the method may include encoding the to-be-encoded video frame according to the target reference frame to obtain the encoded data of the to-be-encoded video frame.

Here, the to-be-encoded video frame may be encoded under the resolution of the to-be-encoded video frame. The encoding may include at least one of prediction, transformation, quantization, and entropy encoding. The encoder side may obtain a current reference frame corresponding to the to-be-encoded video frame, and sample the current reference frame according to a determined sampling manner, to obtain a target reference frame. Prediction is performed according to the target reference frame to obtain a prediction residual, and transformation, quantization, entropy encoding, and the like are performed on the prediction residual to obtain encoded data corresponding to the input video frame.

For example, during calculation of the prediction residual, the current reference frame may be sampled according to the resolution information of the to-be-encoded video frame to obtain a target reference frame having a resolution consistent with that of the to-be-encoded video frame. Then, reference blocks corresponding to code blocks in the to-be-encoded video frame are obtained from the target reference frame. Prediction is performed according to the reference blocks to obtain predicted values corresponding to the code blocks. Then, prediction residuals are obtained according to differences between actual values and the predicted values of the code blocks. During calculation of a motion vector value, if the reference frame has a different resolution, location information of the code block or location information of a decoded block may be transformed according to the resolutions of the reference frame and the to-be-encoded video frame. Then, the motion vector value is obtained according to the transformed location information.

In an embodiment, the encoding the to-be-encoded video frame under the resolution of the to-be-encoded video frame to obtain encoded data corresponding to the input video frame includes: obtaining an encoding manner corresponding to the encoding of the to-be-encoded video frame under the resolution of the to-be-encoded video frame; and adding, to the encoded data corresponding to the input video frame, encoding manner information corresponding to the encoding manner.

The encoding manner is a processing manner related to encoding performed by the encoder side. For example, the encoding manner may include one or more of the following: an upsampling manner used by a video frame reconstructed after decoding of the reference frame during encoding, a rule corresponding to a reference rule, and sub-pixel interpolation on the reference frame. The encoding manner information corresponding to the encoding manner is added to the encoded data corresponding to the input video frame, so that the decoder side may decode a to-be-decoded video frame according to the encoding manner information.

In an embodiment, the encoding manner information corresponding to the encoding manner may not be added to the encoded data. Instead, an encoding manner is preset in the encoder side and the decoder side so that a decoding manner corresponds to the encoding manner. Alternatively, the encoder side and the decoder side may obtain a corresponding encoding manner and decoding manner through calculation according to a same algorithm or corresponding algorithms. For example, it is preset in an encoding and decoding standard that a method used by the encoder side for upsampling the current reference frame is the same as a method used by the decoder side for upsampling the current reference frame.

In an embodiment, the encoder side may determine a first vector transformation parameter according to the resolution information of the to-be-encoded video frame and first resolution information, where the first resolution information includes the resolution information of the current reference frame or target motion vector unit resolution information corresponding to the input video frame; and obtain target motion vectors corresponding to the code blocks in the to-be-encoded video frame according to the first vector transformation parameter.

The first vector transformation parameter may be used for transforming location information for obtaining a motion vector or used for transforming a motion vector. The resolution information is information related to a resolution, and may be, for example, the resolution itself or a downsampling ratio. The first vector transformation parameter may be a ratio between the resolution information of the to-be-encoded video frame and the first resolution information. For example, it is assumed that a downsampling ratio of the current reference frame is 1/3, and a downsampling ratio of the to-be-encoded video frame is 1/6. In this case, the first vector transformation parameter may be 1/3 divided by 1/6, that is, 2.

In an embodiment, after the first vector transformation parameter is obtained, the obtained motion vector or the location information corresponding to the motion vector is transformed according to the first vector transformation parameter to obtain the target motion vector. When the target motion vector is transformed by using the first vector transformation parameter, the target motion vector is made to be a motion vector according to a target resolution represented by the target motion vector unit resolution information. The target motion vector unit resolution information includes information corresponding to a target resolution corresponding to a unit of the target motion vector, and may be, for example, the target resolution itself or a downsampling ratio. When the location information corresponding to the motion vector is transformed by using the first vector transformation parameter, location information corresponding to the to-be-encoded video frame and the location information of the current reference frame are made to be under a same quantization scale. A second motion vector is obtained according to transformed location information, and the second motion vector is transformed to be the target motion vector according to the target resolution.

In an embodiment, the step of determining a first vector transformation parameter according to the resolution information of the to-be-encoded video frame and first resolution information includes: determining the first vector transformation parameter according to the resolution information of the to-be-encoded video frame and the resolution information of the current reference frame. In an embodiment, the step of obtaining motion vectors corresponding to the code blocks in the to-be-encoded video frame according to the first vector transformation parameter includes: obtaining first location information corresponding to a current code block, and obtaining second location information corresponding to a target reference block corresponding to the current code block; and calculating a target motion vector corresponding to the current code block according to the first vector transformation parameter, the first location information, and the second location information.

The current code block is a code block that requires predictive encoding currently in the input video frame. The target reference block is an image block that is in the reference frame and that is used for performing predictive encoding on the current code block. The first location information corresponding to the current code block may be represented by coordinates of pixels. The first location information corresponding to the current code block may include coordinates corresponding to all pixels of the current code block, or the first location information corresponding to the current code block may include coordinates of one or more pixels of the current code block. The second location information corresponding to the target reference block may include coordinates corresponding to all pixels of the target reference block, or the second location information corresponding to the target reference block may include coordinates of one or more pixels of the target reference block. For example, coordinates of the first pixel point of a current image block may be used as a coordinate value of the current code block, and coordinates of the first image pixel point of the target reference block may be used as a coordinate value of the target reference block.

In an embodiment, the first location information may be transformed by using the first vector transformation parameter to obtain corresponding first transformed location information, and the target motion vector is obtained according to a difference between the first transformed location information and the second location information. Alternatively, the second location information may be transformed by using the first vector transformation parameter to obtain corresponding second transformed location information, and the target motion vector is obtained according to a difference between the first location information and the second transformed location information.

In an embodiment, the first vector transformation parameter is a ratio obtained by dividing larger resolution information between the resolution information of the to-be-encoded video frame and the resolution information of the current reference frame by smaller resolution information thereof. The first vector transformation parameter is used for transforming location information of a frame with the smaller resolution information in the to-be-encoded video frame and the current reference frame. For example, the resolution of the to-be-encoded video frame is 1200*1200 pixels, and the resolution of the current reference frame is 600*600 pixels. In this case, the larger resolution is 1200*1200 pixels, and the smaller resolution is 600*600 pixels. The first vector transformation parameter may be 2. It is assumed that the first location information is (6, 8), and the second location information is (3, 3). In this case, the target motion vector is (6, 8)−(3*2, 3*2)=(0, 2). In this embodiment, by transforming the location information corresponding to the frame with the smaller resolution information, the value of the target motion vector may be reduced, thereby reducing the amount of data of the encoded data.

In an embodiment, the first vector transformation parameter is a ratio obtained by dividing smaller resolution information between the resolution information of the to-be-encoded video frame and the resolution information of the current reference frame by larger resolution information thereof. The first vector transformation parameter is used for transforming location information of a frame with the larger resolution information in the to-be-encoded video frame and the current reference frame. For example, it is assumed that the resolution of the to-be-encoded video frame is 1200*1200 pixels, the resolution of the current reference frame is 600*600 pixels, and the first vector transformation parameter may be 1/2. It is assumed that the first location information is (6, 8), and the second location information is (3, 3). In this case, the target motion vector is (6*1/2, 8*1/2)−(3, 3)=(0, 1).

In this embodiment, by transforming the location information by using the first vector transformation parameter, the obtained location information is under the same quantization scale, thereby reducing the value of the target motion vector, and the amount of data of the encoded data.

In an embodiment, the step of determining a first vector transformation parameter according to the resolution information of the to-be-encoded video frame and first resolution information includes: obtaining target motion vector unit resolution information; and determining the first vector transformation parameter according to the resolution information of the to-be-encoded video frame and the target motion vector unit resolution information. The step of obtaining target motion vectors corresponding to the code blocks in the to-be-encoded video frame according to the first vector transformation parameter includes: obtaining a first motion vector according to a displacement between a current code block and a corresponding target reference block; and obtaining a target motion vector corresponding to the current code block according to the first vector transformation parameter and the first motion vector.

The target motion vector unit resolution information refers to information corresponding to a target resolution corresponding to a unit of the target motion vector, and may be, for example, the target resolution or a corresponding downsampling ratio. The target motion vector is calculated by using a vector unit under this resolution as a standard. Among all to-be-encoded video frames corresponding to an input video sequence, some to-be-encoded video frames may have the same resolutions as an original resolution of input video frames, while other to-be-encoded video frames may have resolutions lower than that of the original resolution of the input video frames. That is, the to-be-encoded video frames in the video sequence may have a plurality of resolutions. Therefore, the resolution corresponding to the unit of the target motion vector needs to be determined. The resolution corresponding to the unit of the target motion vector may be set before encoding or obtained according to a parameter of an encoding process. However, the embodiment of determining the resolution corresponding to the unit of the target motion vector is not limited thereto.

Furthermore, the first motion vector is obtained according to the displacement between the current code block and the corresponding target reference block. The target reference block may be obtained from the current reference frame, or from the target reference frame that is obtained after the current reference frame is processed. After the first motion vector is obtained, the first vector transformation parameter may be multiplied by the first motion vector, and an obtained product is used as the target motion vector. For example, it is assumed that the resolution corresponding to the unit of the target motion vector is the original resolution, and a downsampling ratio corresponding to the to-be-encoded video frame is 1/2. Because the unit of the target motion vector is the original resolution while the first motion vector is obtained through calculation under the resolution of the to-be-encoded video frame, the first motion vector needs to be transformed. The first vector transformation parameter is equal to 2. When the obtained first motion vector is (2, 2), the target motion vector is (4, 4). After the target motion vector is obtained, encoding may be performed according to the target motion vector. For example, the target motion vector and the prediction residual corresponding to the current code block may be encoded to obtain encoded data.

In an embodiment, when the target reference block is obtained from the current reference frame, it may be understood that for the same code block, the first motion vector may be equal to the second motion vector.

In an embodiment, the resolution corresponding to the unit of the target motion vector may be the resolution corresponding to the input video frame, that is, the original resolution, or the resolution corresponding to the unit of the target motion vector may be the resolution corresponding to the to-be-encoded video frame. The first vector transformation parameter may be a ratio between resolution information corresponding to the unit of the target motion vector and the resolution information of the to-be-encoded video frame. For example, it is assumed that the resolution corresponding to the unit of the target motion vector is the original resolution, a sampling ratio corresponding to the unit of the target motion vector is 1, and a sampling ratio of the resolution of the to-be-encoded video frame is 1/2. In this case, the first vector transformation parameter may be 1 divided by 1/2, that is, 2. Alternatively, it is assumed that the resolution corresponding to the unit of the target motion vector is the original resolution of 900*900 pixels; the sampling ratio of the resolution of the to-be-encoded video frame is 450*600 pixels; and there may be two first vector transformation parameters: a first vector transformation parameter in a horizontal direction and a first vector transformation parameter in a vertical direction. In this case, the first vector transformation parameter in the horizontal direction is 900/450=2, and the first vector transformation parameter in the vertical direction is 900/600=1.5.

In an embodiment, the target motion vector unit resolution information may be obtained according to a computing power of a device performing encoding. For example, when the device performing encoding can only perform integer calculation or it takes a long calculation time in the case of a decimal value, the resolution corresponding to the unit of the target motion vector may be the original resolution corresponding to the input video frame. When the device performing encoding can perform decimal calculation quickly, the resolution corresponding to the unit of the target motion vector may be the resolution corresponding to the to-be-encoded video frame.

In an embodiment, when the resolution information of the to-be-encoded video frame is consistent with the target motion vector unit resolution information, the first vector transformation parameter is 1, and the first motion vector is the same as the target motion vector. Therefore, the step of determining a first vector transformation parameter according to the resolution information of the to-be-encoded video frame and first resolution information may be omitted, and the first motion vector is directly used as the target motion vector. When the resolution information of the to-be-encoded video frame is not same as the target motion vector unit resolution information, the step of determining a first vector transformation parameter according to the resolution information of the to-be-encoded video frame and first resolution information is performed.

In this embodiment, when the resolution corresponding to the unit of the target motion vector is the resolution corresponding to the input video frame, that is, the original resolution, for a video sequence with a uniform resolution, target resolutions corresponding to all input video frames are consistent, so that the target motion vectors can be kept uniform. When the resolution corresponding to the unit of the target motion vector is the resolution corresponding to the to-be-encoded video frame, because the resolution information of the to-be-encoded video frame is consistent with the target motion vector unit resolution information, the first motion vector does not need to be transformed, thereby reducing a computing time.

In an embodiment, identification information representing the target motion vector unit resolution information may be added to the encoded data, where the identification information is used for representing resolution information corresponding to the target motion vector. An adding position of the identification information in the encoded data may be one or more of video frame group header information, sequence header information, frame header information, and block-level header information, where the block-level header information refers to header information of encoded data corresponding to a code block. The adding position of the identification information in the encoded data may be determined according to a range of the target motion vector unit resolution information. For example, if resolutions corresponding to vector units in a video sequence are consistent, the adding position may be the sequence header information. Resolution information represented by the value of the flag may be set according to a requirement. For example, when the resolution corresponding to the target motion vector unit resolution information is the original resolution, the corresponding flag MV_Scale_Adaptive is 0; when the resolution corresponding to the target motion vector unit resolution information is the resolution corresponding to the to-be-encoded video frame, the corresponding flag MV_Scale_Adaptive is 1.

In an embodiment, step S510 of encoding the to-be-encoded video frame according to the target reference frame to obtain encoded data corresponding to the to-be-encoded video frame includes: obtaining an initial predicted motion vector corresponding to a current code block; obtaining a second vector transformation coefficient according to current motion vector unit resolution information corresponding to the initial predicted motion vector and the target motion vector unit resolution information; obtaining a target predicted motion vector corresponding to the current code block according to the initial predicted motion vector and the second vector transformation coefficient; and obtaining a motion vector difference according to the target motion vector and the target predicted motion vector.

Furthermore, to reduce the quantity of bits used for encoded data, a motion vector of the current code block may be predicted to obtain a predicted value, a difference between the target motion vector and the predicted value is calculated to obtain a motion vector difference, and the motion vector difference is encoded. The initial predicted motion vector is used for predicting the motion vector of the current code block. There may be one or more initial predicted motion vectors, and this may be set according to a requirement. An obtaining rule of the initial predicted motion vector may be set according to a requirement. Because the current code block is usually spatially correlated to an adjacent code block, a target motion vector value corresponding to one or more adjacent encoded blocks corresponding to the current code block may be used as the initial predicted motion vector. For example, a first motion vector value corresponding to adjacent encoded blocks at the upper right corner and upper left corner in the current code block may be used as the initial predicted motion vector. Alternatively, a motion vector value of the target reference block corresponding to the current code block may be used as the initial predicted motion vector.

Further, the current motion vector unit resolution information refers to information corresponding to a current resolution that corresponds to a unit of the initial predicted motion vector, and may be, for example, the current resolution or a downsampling ratio. The resolution corresponding to the unit of the initial predicted motion vector means that the unit of the initial predicted motion vector is calculated by using a vector unit under the current resolution as a standard, that is, the motion vector according to the current resolution. When the current motion vector unit resolution information corresponding to the initial predicted motion vector is different from the target motion vector unit resolution information, the second vector transformation coefficient needs to be obtained according to the current motion vector unit resolution information corresponding to the initial predicted motion vector and the target motion vector unit resolution information. The second vector transformation coefficient is used for transforming the initial predicted motion vector into a motion vector under a target resolution. The second vector transformation coefficient may be a ratio between the resolution information corresponding to the unit of the target motion vector and the current motion vector unit resolution information. For example, it is assumed that the resolution corresponding to the unit of the target motion vector is 200*200 pixels, and the current motion vector unit resolution information is 100*100 pixels. In this case, the second vector transformation coefficient may be 2.

Further, after the second vector transformation coefficient is obtained, calculation is performed according to the initial predicted motion vector and the second vector transformation coefficient to obtain a target predicted motion vector. The target predicted motion vector is a predicted motion vector under the target resolution. For example, when there is one initial predicted motion vector, a product between the initial predicted motion vector and the second vector transformation coefficient may be used as the target predicted motion vector. When there are a plurality of initial predicted motion vectors, calculation may be performed on the initial predicted motion vectors to obtain a calculation result, and the target motion vector is obtained according to the calculation result and the second vector transformation coefficient. The calculation result may be one or more of a minimum value, a mean value, and a median value of the initial predicted motion vectors. It may be appreciated that an algorithm for obtaining the target predicted motion vector according to the initial predicted motion vector and the second vector transformation coefficient may be customized, and the customized algorithm may be used at the decoder side to obtain the same target predicted motion vector through calculation.

Further, a difference between the target motion vector and the target predicted motion vector is used as a motion vector difference to perform encoding according to the motion vector difference to obtain encoded data, thereby reducing the data amount of the encoded data.

In this embodiment, the initial predicted motion vector is transformed to obtain the target predicted motion vector according to the target resolution, so that units of the target predicted motion vector and the target motion vector are under quantization scales matching each other. Therefore, the obtained motion vector difference is small, thereby reducing the data amount of the encoded data.

In this embodiment, a sampling manner of a current reference frame corresponding to a to-be-encoded video frame can be flexibly selected, so that the current reference frame is correspondingly sampled to obtain a target reference frame. The to-be-encoded video frame is encoded according to the target reference frame to reduce the amount of data of to-be-encoded data. The sampling manner of the current reference frame can be selected flexibly to perform sampling and reconstruction on the current reference frame and adjust a resolution of the current reference frame. Therefore, the current reference frame, even if having a resolution different from that of the current to-be-encoded video frame, may still be used as a reference frame, thereby improving the use efficiency of the reference frame, the accuracy of inter-frame prediction, the quality of an encoded image and reducing a prediction residual.

The video encoding method herein is described on the assumption that a video sequence A includes three input video frames: a, b, and c.

1. A target video sequence encoding mode corresponding to the video sequence A is obtained. In this embodiment, because a current environment is a video call environment, the target video sequence encoding mode is the mixed-resolution encoding mode.

2. A decision is made for the first input video frame a by using a processing deciding unit in the mixed-resolution encoding framework to obtain that a processing manner is a downsampling manner, and a downsampling ratio is 1/2. The video frame a is downsampled, to obtain a video frame a1 after the downsampling. Intra-frame encoding is performed on the video frame a1 to obtain encoded data d1 corresponding to a1, and the encoded data d1 corresponding to a1 is reconstructed to obtain a corresponding reconstructed video frame a2.

3. A decision is made for the second input video frame b by using the processing deciding unit in the mixed-resolution encoding framework to obtain that a processing manner is a downsampling manner, and a downsampling ratio is 1/4. The video frame b is downsampled, to obtain b1, b1 is encoded to obtain encoded data corresponding to the video frame b, and sampling ratio information corresponding to the downsampling ratio and processing manner information corresponding to the processing manner are stored in the encoded data to be carried with the encoded data.

The encoding process includes: the reconstructed video frame a2 being used as a current reference frame because the second input video frame b is an inter-predicted frame, and the reconstructed video frame a2 needs to be sampled because the downsampled video frame b1 and the reconstructed video frame a2 have different resolutions. It is determined that the sampling manner of a2 is direct sub-pixel interpolation, and motion estimation precision is 1/4. Therefore, pixel interpolation precision is 1/4*2=1/2. 1/2 sub-pixel interpolation is performed on the reconstructed video frame a2 according to the pixel interpolation precision to obtain a target reference frame a3. A first motion vector MV1 between a current code block in b1 and a target reference block in the target reference frame is calculated, and a prediction residual is p1. In addition, it is obtained that a target resolution is an original resolution. Therefore, the target motion vector is 4MV1. It is obtained through calculation that an initial predicted vector is MV2, and the initial predicted vector is obtained through calculation under a resolution corresponding to a downsampling ratio of 1/4. Therefore, a target predicted vector is 4MV2. Therefore, a motion vector difference MVD1 corresponding to the current code block is equal to 4MV1-4MV2. Transformation, quantization, and entropy encoding are performed on MVD1 and p1, to obtain encoded data.

4. A decision is made for the third input video frame c by using the processing deciding unit in the mixed-resolution encoding framework, to obtain that a processing manner is a downsampling manner, and a downsampling ratio is 1/8. The video frame c is downsampled, to obtain c1, and c1 is encoded to obtain encoded data d2 corresponding to c.

The encoding process includes: because c is an inter-predicted frame, a corresponding current reference frame is a reconstructed video frame b2 obtained by reconstructing encoded data of b; and b2 needs to be sampled because c1 and b2 have different resolutions. It is determined that the sampling manner of b2 is direct sub-pixel interpolation, and motion estimation precision is 1/4. Therefore, pixel interpolation precision is 1/4*2=1/2. 1/2 sub-pixel interpolation is performed on b2 according to the pixel interpolation precision, to obtain a target reference frame b3. A first motion vector MV3 between a current code block in c1 and a target reference block in the target reference frame is calculated, and a prediction residual is p2. In addition, it is obtained that a target resolution is an original resolution. Therefore, the target motion vector is 8MV3. It is obtained that an initial predicted vector is MV4, and the initial predicted vector is calculated under a resolution corresponding to a downsampling ratio of 1/4. Therefore, a target predicted vector is 4MV4. Therefore, a motion vector difference MVD2 corresponding to the current code block is equal to 8MV3-4MV4. Transformation, quantization, and entropy encoding are performed on MVD2 and p2, to obtain encoded data d3.

5. An encoded data packet formed by d1, d2, and d3 is used as encoded data corresponding to the video sequence, and is sent to a receiving terminal, where the encoded data corresponding to the video sequence carries a flag for describing that the target video sequence encoding mode is the mixed-resolution encoding mode.

Figure 10:
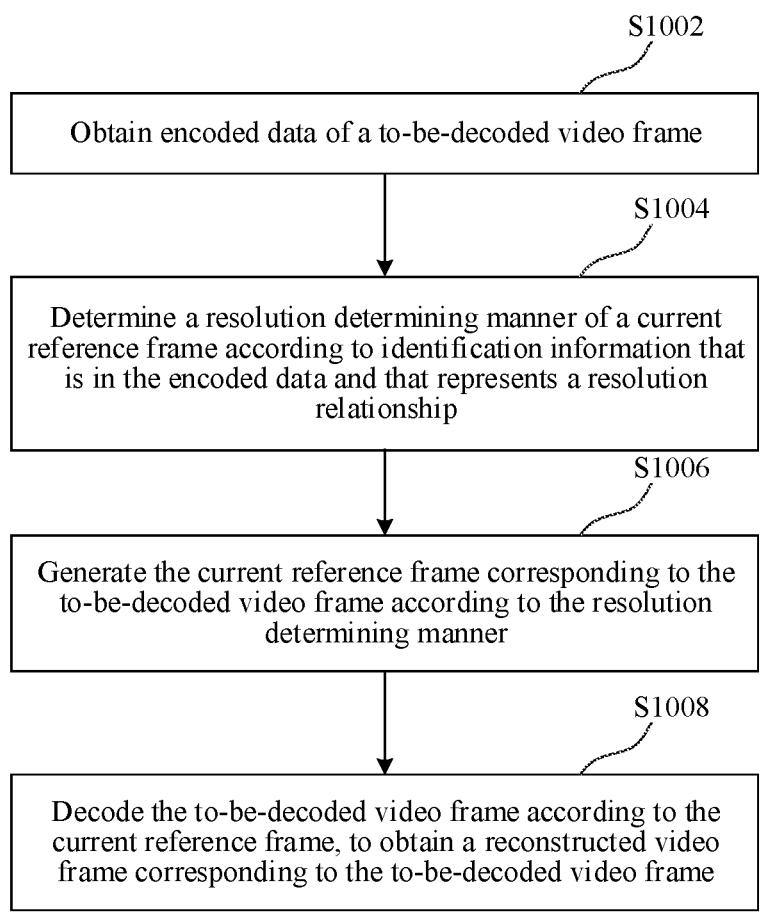
FIG. 10 is a flowchart of a video decoding method according to an embodiment.

FIG. 10 is a flowchart illustrating a video decoding method according to an embodiment. This embodiment is described mainly by using an example in which the method is applied to the terminal 110 or the server 120 in FIG. 1. Referring to FIG. 10, the video decoding method includes the following steps.

In S1002, the method may include obtaining encoded data of a to-be-decoded video frame.

Here, the encoded data is data to be decoded. The encoded data may be obtained by an encoder side by encoding an input video frame according to a full-resolution processing manner, or may be obtained by the encoder side by downsampling an input video frame according to a downsampling processing manner and then encoding the downsampled video frame. In addition, a decoder side may receive, through a network, the encoded data sent by the encoder side.

In S1004, the method may include determining a resolution determining manner (or method) of a current reference frame according to identification information that is in the encoded data and that represents a resolution relationship.

The current reference frame is a video frame used as a reference during decoding of the to-be-decoded video frame. The current reference frame is a video frame obtained by reconstructing encoded data corresponding to a video frame that can be used as a reference frame. According to different inter-frame prediction types, the current reference frame corresponding to the current to-be-decoded video frame may be a forward reference frame or a bi-directional reference frame, and there may be one or more current reference frames corresponding to the to-be-decoded video frame. The current reference frame in the video decoding method corresponds to the current reference frame in the video encoding method.

The identification information of the resolution relationship is information used for identifying a resolution correspondence between the to-be-decoded video frame and the reference frame. The resolution determining manner is a sampling manner, and the sampling manner is a manner for sampling the video frame, and may include a sampling ratio and/or a sampling method. In this embodiment, the resolution determining manner refers to a sampling manner for sampling the current reference frame.

Here, there may be a plurality of sampling methods, for example, bilinear interpolation, bicubic interpolation, a CNN-based algorithm, or a method based on statistical characteristics. In a case that the CNN-based algorithm is used, when the current reference frame needs to be upsampled, upsampling may be performed by using a super-resolution reconstruction model (such as a super-resolution CNN model) to reconstruct the current reference frame. In a case that the method based on statistical characteristics is used, a nearest neighbor interpolation method, a mean interpolation method, or a median interpolation method may be used.

In an embodiment, when the encoder side and the decoder side agree on a fixed sampling manner, the decoder side may sample the current reference frame according to the agreed sampling manner.

In an embodiment, the decoder side may determine the sampling manner corresponding to the to-be-decoded video frame according to local hardware information of a device that performs the video decoding method and/or image feature information of the to-be-decoded video frame.

In an embodiment, in a case that the encoder side adds, to encoded data corresponding to a current reference frame, sampling manner information for sampling the current reference frame corresponding to a to-be-encoded video frame during encoding of the to-be-encoded video frame, the decoder side may obtain the sampling manner information from corresponding header information, and determine, according to the read sampling manner information, the sampling manner configured for the to-be-decoded video frame. For example, in a case that the encoder side adds the sampling manner information to a preset position of frame header information, video frame group header information, or sequence header information corresponding to the encoded data, the decoder side may obtain the sampling manner information from the preset position of the corresponding frame header information, video frame group header information, or sequence header information.

In S1006, the method may include generating the current reference frame corresponding to the to-be-decoded video frame according to the resolution determining manner.

The resolution determining manner is a sampling manner. In a case that a resolution indicated by resolution information of the to-be-decoded video frame is greater than a resolution indicated by resolution information of the current reference frame, the current reference frame is upsampled based on the sampling manner according to the resolution information of the to-be-decoded video frame, to obtain a corresponding target reference frame.

The upsampling processing is an imaging process of scaling up an image by using, for example, an interpolation method, where based on original image pixels, new elements are inserted between pixel points by using an appropriate interpolation algorithm. When a resolution indicated by resolution information of the to-be-decoded video frame is greater than a resolution indicated by resolution information of the current reference frame, a to-be-decoded video frame in a full-resolution manner is referenced to a current reference frame processed in a downsampling manner; alternatively, a to-be-decoded video frame processed in a downsampling manner is referenced to a current reference frame processed in a downsampling manner, and a downsampling ratio of the to-be-decoded video frame is greater than a downsampling ratio of the current reference frame.

In an embodiment, the step of determining the sampling manner corresponding to the to-be-decoded video frame includes: determining, according to local hardware information and/or image feature information of the to-be-decoded video frame, a sampling manner for upsampling the current reference frame.

In an embodiment, the current reference frame is upsampled in a case that the resolution indicated by the resolution information of the to-be-decoded video frame is greater than the resolution indicated by the resolution information of the current reference frame. A sampling manner for upsampling the current reference frame may be determined according to the local hardware information and/or the image feature information of the to-be-decoded video frame. For example, a device with a high processor processing capacity corresponds to a high-complexity upsampling method, and a device with a low processor processing capacity corresponds to a low-complexity upsampling method. As another example, for a video frame having a large amount of complex image feature information, a high complexity sampling method may be selected for upsampling the current reference frame. For a video frame having a small amount of simple image feature information, a low complexity sampling method may be selected for upsampling the current reference frame. Alternatively, the local hardware information of the device that performs video encoding and image features of the to-be-decoded video frame may be considered in combination, to select a most appropriate current upsampling manner.

In an embodiment, the current reference frame is upsampled in a case that the resolution indicated by the resolution information of the to-be-decoded video frame is greater than the resolution indicated by the resolution information of the current reference frame. Optionally, the current reference frame may be upsampled based on the configured sampling manner according to the resolution information of the to-be-decoded video frame, to obtain a target reference frame having a resolution consistent with that of the to-be-decoded video frame.

In an embodiment, in a case that the resolution indicated by the resolution information of the to-be-decoded video frame is less than the resolution indicated by the resolution information of the current reference frame, the current reference frame is downsampled based on the sampling manner according to the resolution information of the to-be-decoded video frame, to obtain the corresponding target reference frame.

The downsampling processing is an image processing for scaling down an image. That is, when the resolution indicated by the resolution information of the to-be-decoded video frame is less than the resolution indicated by the resolution information of the current reference frame, a to-be-decoded video frame processed in a downsampling manner is referenced to a current reference frame in a full-resolution manner; alternatively, a to-be-decoded video frame processed in a downsampling manner is referenced to a current reference frame processed in a downsampling manner, and a downsampling ratio of the to-be-decoded video frame is less than a downsampling ratio of the current reference frame.

For example, it may be assumed that the resolution of the to-be-decoded video frame is 400*800 pixels, and the resolution of the current reference frame is 800*1600 pixels. In this case, the current reference frame may be downsampled according to the resolution of the to-be-decoded video frame to obtain the corresponding target reference frame, and then video encoding is performed according to the target reference frame. For example, 1/2 downsampling is performed on a width and a height of the current reference frame to obtain the target reference frame with a resolution of 400*800 pixels.

In an embodiment, the current reference frame is downsampled in a case that the resolution indicated by the resolution information of the to-be-decoded video frame is less than the resolution indicated by the resolution information of the current reference frame. In addition, the current reference frame may be downsampled according to a downsampling method corresponding to the to-be-decoded video frame that is processed in a downsampling manner, to obtain a target reference frame having a resolution consistent with that of the to-be-decoded video frame.

In an embodiment, the current reference frame may not be downsampled in a case that the resolution indicated by the resolution information of the to-be-decoded video frame is less than the resolution indicated by the resolution information of the current reference frame. Sub-pixel interpolation processing is directly performed on the current reference frame to obtain the target reference frame.

In an embodiment, the current reference frame may not be sampled in a case that the resolution indicated by the resolution information of the to-be-decoded video frame is equal to the resolution indicated by the resolution information of the current reference frame. Sub-pixel interpolation processing is directly performed on the current reference frame to obtain the target reference frame.

In S1008, the method may include decoding the to-be-decoded video frame according to the current reference frame to obtain a reconstructed video frame corresponding to the to-be-decoded video frame.

The reconstructed video frame is a video frame obtained through decoding and reconstruction. It may be appreciated that resolution information corresponding to the reconstructed video frame corresponds to the resolution information of the to-be-encoded video frame in the encoding process. If there is no loss of image information in the encoding process, the reconstructed video frame is the same as the to-be-encoded video frame. If there is a loss of image information in the encoding process, a difference between the reconstructed video frame and the to-be-encoded video frame corresponds to a loss value. The encoded data is decoded based on the resolution information corresponding to the to-be-decoded video frame. The decoding may include at least one of prediction, inverse transformation, inverse quantization, and entropy decoding, and is determined according to the encoding process. During decoding, at least one of the current reference frame, location information corresponding to each to-be-decoded block of the to-be-decoded video frame, location information corresponding to each reference block of the current reference frame, and a motion vector is processed according to the resolution information of the to-be-decoded video frame, where a processing method matches the processing method used during encoding performed by the encoder side. For example, a current reference frame corresponding to the to-be-decoded video frame may be obtained, and the current reference frame is processed according to the resolution information corresponding to the to-be-decoded video frame, to obtain a target reference frame. A target reference block is obtained according to carried motion vector information, a predicted value corresponding to a to-be-decoded block is obtained according to the target reference block, and a reconstructed video frame is obtained according to a prediction residual in the encoded data and the predicted value.

In an embodiment, the decoder side performs decoding according to the resolution information corresponding to the to-be-decoded video frame. After the current reference frame is obtained, a reference block corresponding to a code block in the to-be-decoded video frame may be obtained from the current reference frame, and the code block is decoded according to the reference block. Alternatively, the current reference frame may be sampled according to the to-be-decoded video frame to obtain the corresponding target reference frame. A target reference block corresponding to a to-be-decoded block in the to-be-decoded video frame is obtained from the target reference frame, and the code block is decoded according to the target reference block to obtain a reconstructed video frame corresponding to the to-be-decoded video frame.

In an embodiment, in a case that the encoder side transforms the location information, when corresponding location information is obtained in the decoding process, the location information needs to be transformed correspondingly to maintain consistency of the target reference blocks obtained by the encoder side and the decoder side.

In an embodiment, when the motion vector information indicated in the encoded data is a target motion vector, the target motion vector may be transformed according to target motion vector unit resolution information and the resolution information corresponding to the to-be-decoded video frame, to obtain a first motion vector according to the resolution information corresponding to the to-be-decoded video frame, and the target reference block corresponding to the to-be-decoded block is obtained according to the first motion vector.

In an embodiment, when the motion vector information indicated in the encoded data is a motion vector difference, an initial predicted motion vector corresponding to a current to-be-decoded block is obtained. A motion vector difference and a predicted motion vector that correspond to each to-be-decoded block are processed under the same resolution, to obtain a first motion vector that corresponds to the corresponding to-be-decoded block and that is under the resolution of the to-be-decoded video frame, and the target reference block corresponding to the to-be-decoded block is obtained according to the first motion vector.

Furthermore, the initial predicted motion vector may be transformed into a target predicted motion vector under a target resolution, a target motion vector is obtained according to the target predicted motion vector and the motion vector difference, and then the target motion vector is transformed into the first motion vector under the resolution of the to-be-decoded video frame. Alternatively, the initial predicted motion vector may be transformed into a predicted motion vector according to the resolution of the to-be-decoded video frame, the motion vector difference may be transformed into a motion vector difference under the resolution of the to-be-decoded video frame, and the first motion vector may be obtained according to the motion vector difference under the resolution of the to-be-decoded video frame and the predicted motion vector under the resolution of the to-be-decoded video frame.

In an embodiment, the decoder side may determine a third vector transformation parameter according to the resolution information corresponding to the to-be-decoded video frame and first resolution information, where the first resolution information includes target motion vector unit resolution information or the resolution information of the current reference frame; obtain a target motion vector corresponding to each to-be-decoded block in the to-be-decoded video frame according to the encoded data; obtain a target reference block corresponding to each to-be-decoded block in the to-be-decoded video frame according to the third vector transformation parameter and the target motion vector; and decode the encoded data according to the target reference blocks to obtain the reconstructed video frame corresponding to the to-be-decoded video frame.

The third vector transformation parameter is used for transforming a motion vector or location information for obtaining a motion vector. The third vector transformation parameter may be a ratio between the first resolution information and the resolution information of the to-be-decoded video frame, and the third vector transformation parameter corresponds to the first vector transformation parameter. When the third vector transformation parameter is used for transforming the target motion vector, the target motion vector may be transformed into a corresponding motion vector according to the resolution corresponding to the to-be-decoded video frame. In this case, the third vector transformation parameter may be a reciprocal of the first vector transformation parameter. When the third vector transformation parameter is used for transforming the location information corresponding to the motion vector, if the first vector transformation parameter in the encoder side is used for transforming the first location information, the third vector transformation parameter is the same as the first vector transformation parameter because the to-be-decoded block has the same location information as the code block. If the first vector transformation parameter in the encoder side is used for transforming the second location information, the third vector transformation parameter is a reciprocal of the first vector transformation parameter because a location value calculated according to the target motion vector and the first location information is a location value obtained after the second location information is transformed in the encoder side according to the first vector transformation parameter.

Further, when the encoded data carries the target motion vector, the target motion vector is read from the encoded data. When the encoded data carries the motion vector difference, the target predicted motion vector may be obtained through calculation, and the target motion vector is obtained according to the motion vector difference and the target predicted motion vector.

Further, after obtaining the third vector transformation parameter, the decoder side transforms the obtained motion vector or the location information corresponding to the motion vector according to the third vector transformation parameter to obtain location information corresponding to the target reference block, thereby obtaining the target reference block.

Further, after the target reference block is obtained, a pixel value of each image block of the reconstructed video frame is obtained according to a pixel value of the target reference block and the prediction residual of the to-be-decoded block indicated in the encoded data, to obtain the reconstructed video frame.

In an embodiment, the step of determining the third vector transformation parameter according to the resolution information corresponding to the to-be-decoded video frame and first resolution information includes: determining the third vector transformation parameter according to the resolution information corresponding to the to-be-decoded video frame and the resolution information of the current reference frame. The step of obtaining the target reference block corresponding to each to-be-decoded block in the to-be-decoded video frame according to the third vector transformation parameter and the target motion vector includes: obtaining first location information corresponding to the current to-be-decoded block; and obtaining the target reference block corresponding to the current to-be-decoded block according to the first location information, the third vector transformation parameter, and the target motion vector.

In addition, second location information corresponding to the target reference block may be obtained according to the first location information, the third vector transformation parameter, and the target motion vector, and obtain the target reference block according to the second location information. Due to the correspondence between encoding and decoding, if the first vector transformation parameter in the encoder side is used for transforming the first location information, the third vector transformation parameter is the same as the first vector transformation parameter because the to-be-decoded block has the same location information as the code block. If the first vector transformation parameter in the encoder side is used for transforming the second location information, the third vector transformation parameter is a reciprocal of the first vector transformation parameter because a location value calculated according to the target motion vector and the first location information is a location value obtained after the second location information is transformed in the encoder side according to the first vector transformation parameter.

For example, the resolution of the to-be-decoded video frame is 1200*1200 pixels, and the resolution of the current reference frame is 600*600 pixels. If the first vector transformation parameter is used for transforming the second location information, and the first vector transformation parameter is 2, the third vector transformation parameter is 1/2. Assuming that the first location information is (6, 8) and the target motion vector is (0, 2), intermediate location information is (6, 8)–(0, 2)=(6, 6), and the second location information corresponding to the target reference block is (6*1/2, 6*1/2)=(3, 3).

For example, the resolution of the to-be-decoded video frame is 1200*1200 pixels, the resolution of the current reference frame is 600*600 pixels, the first vector transformation parameter is used for transforming the first location information, and the first vector transformation parameter is 1/2. In this case, the third vector transformation parameter is 1/2. Assuming that the first location information is (6, 8), the target motion vector is (0, 1). In this case, the second location information is (6*1/2, 8*1/2)–(0, 1)=(3, 3).

In an embodiment, the step of determining the third vector transformation parameter according to the resolution information corresponding to the to-be-decoded video frame and first resolution information includes: determining the third vector transformation parameter according to the resolution information corresponding to the to-be-decoded video frame and target motion vector unit resolution information. The step of obtaining a target reference block corresponding to each to-be-decoded block in the to-be-decoded video frame according to the third vector transformation parameter and the target motion vector includes: obtaining a first motion vector according to the target motion vector and the third vector transformation parameter; and obtaining the target reference block corresponding to the current to-be-decoded block according to the first motion vector.

Furthermore, the third vector transformation parameter is determined according to the resolution information corresponding to the to-be-decoded video frame and the target motion vector unit resolution information, and is used for transforming the target motion vector into the corresponding first motion vector according to the resolution corresponding to the to-be-decoded video frame. After the third vector transformation parameter is obtained, the third vector transformation parameter may be multiplied by the target motion vector, and an obtained product is used as the first motion vector. The process of obtaining the first motion vector according to the third vector transformation parameter and the target motion vector is an inverse process of obtaining the target motion vector corresponding to the current code block according to the first vector transformation parameter and the first motion vector. For example, in the encoder side, the first vector transformation parameter of the code block corresponding to the to-be-decoded block is equal to 2. The obtained first motion vector is (2, 2), and it is obtained that the target motion vector is (4, 4) according to a product of the first vector transformation parameter and the first motion vector (2, 2). In the decoding process, the third vector transformation parameter is 1/2, the obtained target motion vector is (4, 4), and it is obtained that the first motion vector is (2, 2) according to a product of the third vector transformation parameter 1/2 and the target motion vector (4, 4).

In an embodiment, when the encoded data includes the motion vector difference, the step of obtaining the target motion vector corresponding to each to-be-decoded block in the to-be-decoded video frame according to the encoded data includes: obtaining a motion vector difference corresponding to a current to-be-decoded block in the to-be-decoded video frame according to the encoded data; obtaining an initial predicted motion vector corresponding to the current to-be-decoded block; obtaining a second vector transformation coefficient according to current motion vector unit resolution information corresponding to the initial predicted motion vector and target motion vector unit resolution information; obtaining a target predicted motion vector corresponding to the current to-be-decoded block according to the initial predicted motion vector and the second vector transformation coefficient; and obtaining the target motion vector according to the target predicted motion vector and the motion vector difference.

In an embodiment, because the to-be-decoded block in the decoding process and the to-be-encoded block in the encoding process correspond to each other, and rules for obtaining initial predicted motion vectors are the same. Therefore, the initial predicted motion vector corresponding to the current to-be-decoded block is consistent with the initial predicted motion vector corresponding to a current to-be-encoded block. For a method for obtaining the target predicted motion vector, reference may be made to the method in the encoding process, and details are not described again. The target motion vector is a sum of the target predicted motion vector and the motion vector difference.

In this embodiment, a sampling manner of a current reference frame corresponding to a to-be-decoded video frame can be flexibly selected, so that the current reference frame is correspondingly sampled to obtain a target reference frame. Then, the to-be-decoded video frame is decoded according to the target reference frame, to obtain a reconstructed video frame. The sampling manner of the current reference frame can be selected flexibly to perform sampling and reconstruction on the current reference frame and adjust a resolution of the current reference frame. Therefore, the current reference frame, even if having a resolution different from that of the current to-be-decoded video frame, may still be used as a reference frame, thereby improving the use efficiency of the reference frame, improving the accuracy of inter-frame prediction, reducing a prediction residual, and improving the quality of a decoded image.

In an embodiment, the step of sampling the current reference frame based on the sampling manner according to resolution information of the to-be-decoded video frame to obtain a corresponding target reference frame includes: sampling the current reference frame based on the sampling manner according to the resolution information of the to-be-decoded video frame, to obtain an intermediate reference frame; and performing sub-pixel interpolation processing on the intermediate reference frame to obtain the target reference frame.

In the process of decoding the to-be-decoded video frame, a reference block corresponding to a code block in the to-be-decoded video frame may be located in the current reference frame by using a motion search technology. A motion vector is calculated according to motion information of the code block relative to the reference block. The motion vector is decoded to inform the decoder side of a location of reference data corresponding to the reference block in the current reference frame. Therefore, sub-pixel interpolation processing is performed on the intermediate reference frame to obtain a target reference frame, so that motion estimation may be performed on the to-be-decoded video frame according to the target reference frame with a higher resolution, thereby improving the accuracy of motion estimation and improving the quality of the decoded video.

In an embodiment, the current reference frame is sampled based on the determined sampling manner according to the resolution information of the to-be-decoded video frame to obtain an intermediate reference frame, and the intermediate reference frame may be directly used as the target reference frame.

In an embodiment, the decoder side may sample the current reference frame based on the determined sampling manner according to the resolution information of the to-be-decoded video frame to obtain an intermediate reference frame. Sub-pixel interpolation processing is performed on the intermediate reference frame, to obtain the target reference frame.

In an embodiment, the encoder side may specify, in the respective encoding/decoding rule, a sub-pixel interpolation manner used for processing according to the intermediate reference frame to obtain the target reference frame. During decoding, the decoder side may obtain configuration information, from the encoding/decoding rule, to determine the sub-pixel interpolation manner corresponding to processing of the intermediate reference frame. The sub-pixel interpolation manner used by the decoder side is consistent with that used by the encoder side.

In an embodiment, when the encoder side encodes the input video frame by using an adaptive-resolution encoding framework, sub-pixel interpolation manner information corresponding to the sub-pixel interpolation manner is added to the encoded data corresponding to the input video frame. For example, the sub-pixel interpolation manner information is added to corresponding sequence header information, video frame group header information, or frame header information. During decoding, the decoder side may obtain the sub-pixel interpolation manner information from the corresponding sequence header information, video frame group header information, or frame header information, and determine the sub-pixel interpolation manner for the intermediate reference frame according to the obtained sub-pixel interpolation manner information to process the intermediate reference frame, to obtain the target reference frame. Here, a reconstructed video frame may be obtained by decoding the encoded data according to the target reference frame.

The to-be-decoded video frame and the to-be-encoded video frame have the same resolution, and the obtained target reference frames also have the same resolution. Therefore, the step of sampling the current reference frame according to the resolution information corresponding to the to-be-decoded video frame to obtain an intermediate reference frame, and performing sub-pixel interpolation processing on the intermediate reference frame to obtain the target reference frame is the same as that in the encoder side. This embodiment is described above, and details are omitted.

In the foregoing embodiment, the current reference frame is sampled to obtain an intermediate reference frame, and then sub-pixel interpolation processing is performed on the intermediate reference frame to obtain the target reference frame. Sub-pixel interpolation processing is performed on the intermediate reference frame to further improve a degree of image matching between the to-be-decoded video frame and a reference frame, thereby reducing a prediction residual, and improving the pixel precision of motion estimation and the quality of a decoded image.

In an embodiment, the step of sampling the current reference frame based on the sampling manner according to resolution information of the to-be-decoded video frame to obtain a corresponding target reference frame includes: determining, according to the resolution information of the to-be-decoded video frame and resolution information of the current reference frame, a sampling ratio corresponding to the sampling of the current reference frame; and sampling the current reference frame according to the sampling manner and the sampling ratio, to obtain the corresponding target reference frame.

The decoder side may obtain the resolution information of the to-be-decoded video frame and the resolution information of the current reference frame. The sampling ratio corresponding to the sampling of the current reference frame is determined according to the resolution information of the to-be-decoded video frame and the resolution information of the current reference frame. The sampling ratio corresponding to the sampling of the current reference frame needs to meet the following condition: a target reference frame is obtained after the current reference frame is sampled, and a resolution of the target reference frame is kept consistent with that of the to-be-decoded video frame.

In an embodiment, when a to-be-decoded video frame in a full-resolution manner is referenced to a current reference frame processed in a downsampling manner, an upsampling ratio for upsampling and reconstruction of the current reference frame may be a reciprocal of a downsampling ratio corresponding to the current reference frame processed in the downsampling manner. An upsampling direction may be one of vertical upsampling, horizontal upsampling, and vertical and horizontal upsampling.

In an embodiment, when a to-be-decoded video frame processed in a downsampling manner is referenced to a current reference frame processed in a downsampling manner, and a downsampling ratio of the to-be-decoded video frame is greater than a downsampling ratio of the current reference frame, an upsampling ratio for upsampling and reconstruction of the current reference frame needs to meet a condition that a resolution of a target reference frame obtained after the upsampling and reconstruction is kept consistent with a resolution of the to-be-decoded video frame. For example, a resolution of a video frame in a full-resolution manner is 12M*12N, a resolution of a to-be-decoded video frame processed in a 1/2 downsampling manner is 6M*6N, and a resolution of a current reference frame processed in a 1/6 downsampling manner is 2M*2N. In this case, 3× upsampling may be performed on the current reference frame to obtain a target reference frame, where the target reference frame has a resolution of 6M*6N.

In an embodiment, when a to-be-decoded video frame processed in a downsampling manner is referenced to a current reference frame in a full-resolution manner, a downsampling ratio for downsampling and reconstruction of the current reference frame may be a downsampling ratio corresponding to the to-be-decoded video frame processed in the downsampling manner. A downsampling direction may be one of vertical downsampling, horizontal downsampling, and vertical and horizontal downsampling.

In an embodiment, when a to-be-decoded video frame processed in a downsampling manner is referenced to a current reference frame processed in a downsampling manner, and a downsampling ratio of the to-be-decoded video frame is less than a downsampling ratio of the current reference frame, a downsampling ratio for downsampling and reconstruction of the current reference frame needs to meet a condition that a resolution of a target reference frame obtained after the downsampling and reconstruction is kept consistent with a resolution of the to-be-decoded video frame. For example, a resolution of a video frame in a full-resolution manner is 12M*12N, a resolution of a to-be-decoded video frame processed in a 1/6 downsampling manner is 2M*2N, and a resolution of a current reference frame processed in a 1/2 downsampling manner is 6M*6N. In this case, 1/3 downsampling may be performed on the current reference frame to obtain a target reference frame, where the target reference frame has a resolution of 2M*2N.

In an embodiment, in a case that the encoder side adds the sampling ratio information to the frame header information, video frame group header information, or sequence header information, the decoder side may directly read the sampling ratio information in the header information from the corresponding position during decoding. The decoder side determines, according to the sampling ratio information, a sampling ratio for sampling the current reference frame.

In the foregoing embodiment, the corresponding sampling ratio for sampling the current reference frame is determined according to the resolution information of the to-be-decoded video frame and the resolution information of the current reference frame, and then the current reference frame is sampled according to the determined sampling ratio, so that an appropriate target reference frame can be obtained, for example, a target reference frame having a resolution consistent with that of the to-be-decoded video frame, thereby facilitating subsequent video encoding.

In an embodiment, the video decoding method further includes: determining a current decoding mode corresponding to the to-be-decoded video frame according to current encoding mode information carried in the encoded data; and processing the reconstructed video frame corresponding to the to-be-decoded video frame according to the current decoding mode to obtain a decoded video frame.

In addition, each encoded video frame corresponding to the encoded data may include current encoding mode information, and the decoder side may determine a current decoding mode corresponding to the current decoded video frame according to the current encoding mode information. The decoder side may process the reconstructed video frame according to the current decoding mode, to obtain a decoded video frame.

In an embodiment, the decoder side may obtain the current encoding mode information included in the encoded data from the header information of the encoded data, and determine the current decoding mode corresponding to the to-be-decoded video frame according to the current encoding mode information. After obtaining the reconstructed video frame corresponding to the to-be-decoded video frame, the decoder side may process the reconstructed video frame according to the current decoding mode to obtain the decoded video frame. The header information may be frame header information of the encoded data, indicating a processing manner used during encoding of the input video frame corresponding to the current encoded data. For example, when the flag Frame_Resolution_Flag for determining the processing manner in the frame header information of the encoded data is 0, it indicates that all input video frames are processed in a full-resolution processing manner during encoding, and therefore the reconstructed video frame obtained by the decoder side by decoding the encoded data is a decoded video frame corresponding to the to-be-decoded video frame; when Frame_Resolution_Flag is 1, it indicates that the input video frame is processed in a downsampling processing manner during encoding, and the decoder side may perform further processing on the obtained reconstructed video frame according to a processing manner matching the downsampling processing manner to obtain the decoded video frame. Here, the processing may also include, for example, upsampling.

In an embodiment, a decoding framework corresponding to the to-be-decoded video frame may be determined from the header information of the encoded data. The decoder side may obtain, from the sequence header information corresponding to the encoded data, an encoding framework used during encoding of each input video frame in the input video frame sequence corresponding to the current encoded data, thereby determining the matching decoding framework corresponding to the to-be-decoded video frame. For example, when a flag Sequence_Mix_Flag for determining the used encoding framework in the sequence header information of the encoded data is 0, it indicates that a constant-resolution encoding framework is used during encoding of each input video frame in the input video frame sequence, and in this case, the decoder side may use a constant-resolution decoding framework to decode the encoded data to obtain the reconstructed video frame corresponding to the to-be-decoded video frame. When Sequence_Mix_Flag is 1, it indicates that an adaptive-resolution encoding framework is used during encoding of each input video frame in the input video frame sequence, and in this case, the decoder side may use an adaptive-resolution decoding framework to decode the encoded data, to obtain a reconstructed video frame sequence.

In an embodiment, when decoding the encoded data by using the adaptive-resolution decoding framework, the decoder side may further determine a processing manner corresponding to the current to-be-decoded video frame according to a decision algorithm. The decision algorithm is to match a decision algorithm used by the encoder side during encoding of the input video frame.

In an embodiment, when the decoder side determines, according to the header information of the encoded data, that the current encoded data is obtained through encoding in a downsampling processing manner, the decoder side may further obtain used downsampling ratio information or downsampling method information from the header information, and upsample the reconstructed video frame by using an upsampling ratio or an upsampling method matching the downsampling ratio information or the downsampling method information, to obtain the decoded video frame. For example, if a sampling ratio corresponding to the downsampling ratio information is 1/2, the decoder side needs to upsample the reconstructed video frame according to an upsampling ratio of 2 and an upsampling method matching the downsampling method information to obtain the decoded video frame. The decoder side may obtain the downsampling ratio information or the downsampling method information corresponding to the current encoded data from any one of the sequence header information, video frame group header information, and frame header information.

In the foregoing embodiment, the current decoding mode of the to-be-decoded video frame may be determined adaptively, so that appropriate resolutions may be selected adaptively for decoding for different scenarios. The reconstructed video frame corresponding to the to-be-decoded video frame is processed according to the current decoding mode corresponding to the current encoding mode to obtain the decoded video frame. For a code stream encoded in an adaptive variation mode, a reference frame resolution is adjusted adaptively for decoding. The code stream encoded in an adaptive variation mode is a code stream that is encoded by selecting appropriate resolutions for different scenarios, thereby supporting decoding of a code stream with high image quality.

Figure 11:
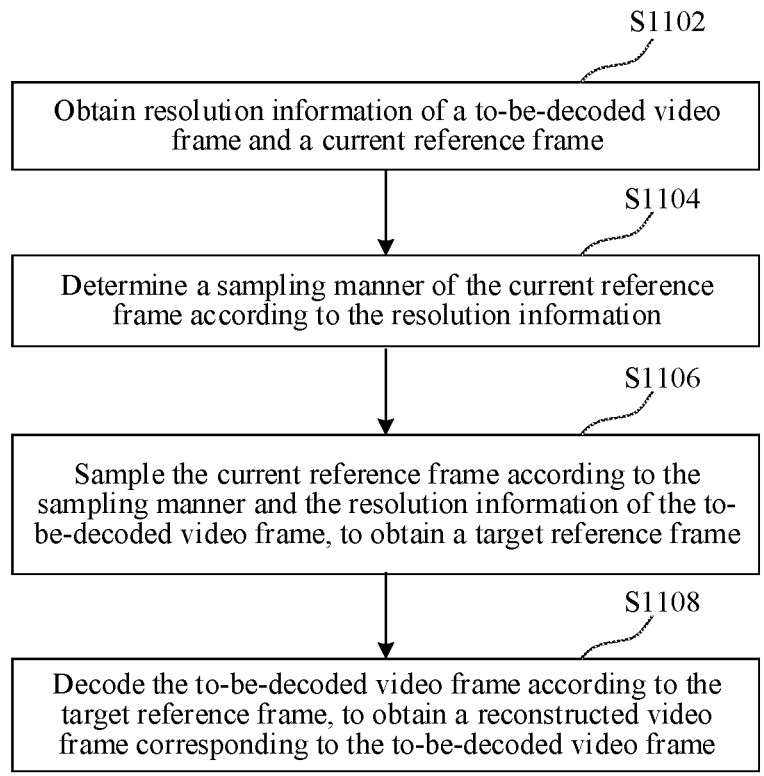
FIG. 11 is a flowchart of steps of obtaining a reconstructed video frame according to an embodiment.

FIG. 11 is a flowchart illustrating the step of obtaining a reconstructed video frame in S1008 according to an embodiment.

In S1102, the method may include obtaining resolution information of the to-be-decoded video frame and the current reference frame.

The resolution information is information representing a resolution value. After obtaining the to-be-decoded video frame and the current reference frame, the server extracts the resolution information of the to-be-decoded video frame and the resolution information of the current reference frame respectively.

In S1104, the method may include determining a sampling manner of the current reference frame according to the resolution information.

The sampling manner is a manner for sampling the video frame, and may include a sampling ratio and/or a sampling method. In this embodiment, the sampling manner refers to a sampling manner for sampling the current reference frame. The sampling the current reference frame includes upsampling or downsampling the current reference frame.

Here, the server compares a resolution indicated by the resolution information of the to-be-decoded video frame with a resolution indicated by the resolution information of the current reference frame. It is determined that the sampling manner of the current reference frame is a downsampling processing manner when the resolution of the to-be-decoded video frame is greater than the resolution of the current reference frame. It is determined that the sampling manner of the current reference frame is an upsampling processing manner when the resolution of the to-be-decoded video frame is less than the resolution of the current reference frame.

In addition, there may be a plurality of sampling methods, for example, bilinear interpolation, bicubic interpolation, a CNN-based algorithm, or a method based on statistical characteristics.

In an embodiment, the encoder side and the decoder side may agree on a fixed sampling method, and the current reference frame is sampled according to the agreed sampling method. In an embodiment, the encoder side may alternatively select an appropriate sampling method from a plurality of preset sampling methods as a sampling manner corresponding to the current to-be-encoded video frame.

In an embodiment, the encoder side or the decoder side may determine the sampling manner corresponding to the to-be-encoded video frame according to local hardware information of a device that performs the video encoding method and/or image feature information of the to-be-encoded video frame. The local hardware information is information related to hardware of a computer device that performs the video encoding/video decoding method, and may include related information about a CPU, a memory, a mainboard, a drive, and the like.

In an embodiment, the method for sampling the current reference frame may be obtained according to a processor capacity of a device, such as a terminal or a server, performing the video encoding or video decoding method. A device with a high processor processing capacity corresponds to a high-complexity sampling method, and a device with a low processor processing capacity corresponds to a low-complexity sampling method. A correspondence between processor processing capacities and sampling methods may be set. When encoding needs to be performed, a processor processing capacity is obtained, and a corresponding sampling method is obtained according to the processor processing capacity. For example, it may be specified that a sampling ratio corresponding to a 16-bit processor is 1/8, and a downsampling ratio corresponding to a 32-bit processor is 1/4. For example, bicubic interpolation is more complex than bilinear interpolation. Therefore, it may be specified that a downsampling method corresponding to the 16-bit processor is bilinear interpolation, and a downsampling method corresponding to the 32-bit processor is bicubic interpolation.

In an embodiment, the method for sampling the current reference frame may alternatively be determined according to image feature information of the to-be-encoded video frame or the to-be-decoded video frame. The image feature information refers to information related to image content of the video frame, and includes image content, image motion information, and image texture information, such as an edge. The image feature information reflects a scenario corresponding to the video frame, detail complexity, motion intensity, and the like. For a video frame having a large amount of complex image feature information, a high complexity sampling method may be selected for sampling the current reference frame. For a video frame having a small amount of simple image feature information, a low complexity sampling method may be selected for sampling the current reference frame. A correspondence between content of a to-be-encoded video frame and a sampling method may be preset. When a video frame is to be encoded, image feature information of the to-be-encoded video frame may be determined in advance, and a corresponding sampling method is obtained according to the image feature information of the to-be-encoded video frame.

In an embodiment, during determining of the sampling manner for sampling the current reference frame, hardware information of the encoder side or the decoder side and the image feature information may be considered in combination, to select a most appropriate current sampling manner.

In S1106, the method may include sampling the current reference frame according to the sampling manner and the resolution information of the to-be-decoded video frame to obtain a target reference frame.

After determining the sampling manner of the current reference frame, the server samples the current reference frame according to the determined sampling manner, so that the resolution of the target reference frame obtained after sampling is the same as the resolution indicated by the resolution information of the to-be-decoded video frame.

For the process of sampling the current reference frame, reference may be made to step S806, and details are not described again.

In the foregoing embodiment, the sampling ratio corresponding to the sampling of the current reference frame is determined according to the resolution information of the to-be-decoded video frame and the resolution information of the current reference frame, and then the current reference frame is sampled according to the determined sampling ratio, so that an appropriate target reference frame can be obtained, for example, a target reference frame having a resolution consistent with that of the to-be-decoded video frame, thereby facilitating subsequent video decoding.

In an embodiment, S1106 further includes: sampling the current reference frame based on the sampling manner according to the resolution information of the to-be-decoded video frame, to obtain an intermediate reference frame; and performing sub-pixel interpolation processing on the intermediate reference frame, to obtain the target reference frame.

Sub-pixel interpolation is a process of obtaining sub-pixel-level reference data through interpolation by using integer-pixel reference data in the intermediate reference frame.

The current reference frame is sampled based on the determined sampling manner according to the resolution information of the to-be-decoded video frame to obtain an intermediate reference frame, and the intermediate reference frame may be directly used as the target reference frame.

For this implementation process, reference may be made to step S806, and details are not described again in this embodiment.

In S1108, the method may include decoding the to-be-decoded video frame according to the target reference frame to obtain a reconstructed video frame corresponding to the to-be-decoded video frame.

For the implementation of this step, reference may be made to step S1008, and details are not described again.

In an embodiment, after S1108, the method further includes a step of obtaining a decoded video frame sequence. The step includes the following content: determining a reconstructed video frame sampling manner according to the identification information representing the resolution relationship; sampling the reconstructed video frame according to the reconstructed video frame sampling manner to obtain a decoded video frame; and obtaining the decoded video frame sequence according to the decoded video frame.

The identification information representing the resolution relationship is used for identifying a resolution correspondence between the to-be-encoded video frame and the reference frame. The decoder side determines the resolution relationship between the to-be-encoded video frame and the reference frame according to the identification information representing the resolution relationship. The decoder side extracts the resolution information of the to-be-encoded video frame from the resolution relationship, determines the reconstructed video frame sampling manner according to the extracted resolution information of the to-be-encoded video frame, and samples the reconstructed video frame to obtain the decoded video frame. The decoder side arranges decoded video frames according to timestamps in the decoded video frames to obtain the decoded video frame sequence.

In an embodiment, the decoder side extracts the resolution information of the to-be-encoded video frame from the resolution relationship. When the extracted resolution information of the to-be-encoded video frame is a downsampled to-be-encoded video frame, the decoder side determines that the reconstructed video frame sampling manner is an upsampling processing manner, and upsamples the reconstructed video frame according to the upsampling processing manner to obtain the decoded video frame.

In an embodiment, when the extracted resolution information of the to-be-encoded video frame is an original-resolution to-be-encoded video frame, the decoder side directly uses the reconstructed video frame as the decoded video frame.

In an embodiment, the sampling the reconstructed video frame according to the reconstructed video frame sampling manner to obtain a decoded video frame includes: determining an application range of the resolution relationship, the application range including a frame sequence range and a frame group range; and sampling a reconstructed video frame corresponding to the application range according to the reconstructed video frame sampling manner, to obtain a decoded video frame corresponding to the application range.

The application range of the resolution relationship is a video frame range to which the resolution relationship is applicable, and the application range may be a frame sequence range or a frame group range.

When the application range of the resolution relationship is the frame sequence range, a reconstructed video frame in the frame sequence range is determined, the reconstructed video frame in the frame sequence range is sampled according to the reconstructed video frame sampling manner to obtain a decoded video frame in the frame sequence range, and the decoded video frame sequence is generated according to the decoded video frame.

In an embodiment, the application range is the frame group range. The sampling a reconstructed video frame corresponding to the application range according to the reconstructed video frame sampling manner to obtain a decoded video frame corresponding to the application range includes: sampling a reconstructed video frame corresponding to the frame group range according to the reconstructed video frame sampling manner, to obtain a decoded video frame corresponding to the frame group range. The obtaining a decoded video frame sequence according to the decoded video frame includes: generating a decoded video frame group according to the decoded video frame corresponding to the frame group range; and forming the decoded video frame sequence according to the generated decoded video frame group.

In addition, when the application range of the resolution relationship is the frame group range, a reconstructed video frame in the frame group range is determined, the reconstructed video frame in the frame group range is sampled according to the reconstructed video frame sampling manner to obtain a decoded video frame in the frame group range. In this way, decoded video frames in all frame group ranges are obtained, and the decoded video frame sequence is constructed according to the decoded video frames in all the frame group ranges. Reconstructed video frame sampling manners corresponding to reconstructed video frames in different frame group ranges may be different. The reconstructed video frame sampling manners include a reconstructed video frame upsampling manner and a reconstructed video frame downsampling manner.

In this embodiment, according to the application range of the resolution relationship, the reconstructed video frame in the application range is sampled according to the reconstructed video frame sampling manner to obtain the decoded video frame, so that the video frame sequence is obtained according to the decoded video frame, thereby improving the decoding quality of the decoded video frame in the application range of the resolution relationship.

In the following, decoding of encoded data corresponding to a video sequence A is used as an example to describe the video decoding method. It is assumed that at the decoder side, names of to-be-decoded video frames corresponding to input video frames a, b, and c are e, f, and g respectively.

1. A receiving terminal obtains encoded data corresponding to the video sequence A, and obtains, from sequence header information corresponding to the encoded data, that a target video sequence encoding mode is a mixed-resolution encoding mode. Therefore, the encoded data is decoded by using a mixed-resolution decoding framework.

2. A resolution information obtaining unit of the mixed-resolution decoding framework obtains resolution information corresponding to the first to-be-decoded video frame e. It may be appreciated that, encoded data corresponding to e is data obtained by encoding a1. Intra-frame decoding is performed on the first to-be-decoded video frame e, to obtain a reconstructed video frame e1. Because resolution information corresponding to e is 1/2, the reconstructed video frame e1 may be upsampled by using a sampling ratio of 2, to obtain a decoded video frame e2.

3. The resolution information obtaining unit of the mixed-resolution decoding framework obtains resolution information corresponding to the second to-be-decoded video frame f. It may be appreciated that, encoded data corresponding to f is data obtained by encoding b1. Inter-frame decoding is performed on f, to obtain a reconstructed video frame f1. Because resolution information corresponding to f is a downsampling ratio of 1/4, the reconstructed video frame f1 may be upsampled by using a sampling ratio of 4, to obtain a decoded video frame f2.

A decoding process is as follows: because f is an inter-predicted frame, the reconstructed video frame e1 needs to be used as a current reference frame. It may be appreciated that, e1 is the same as a2, and e1 is sampled in the same manner as a2, to obtain e3. Herein, e3 is the same as a3, and is used as a target reference frame. It is obtained from the encoded data that a motion vector difference corresponding to the current to-be-decoded block is MVD1. Because MVD1 is obtained under a target resolution, that is, an original resolution, MVD1 needs to be converted into a motion vector difference under a resolution corresponding to f. Therefore, it may be obtained that MVD3 is MVD1/4. It is obtained that an initial predicted vector is MV2, and the initial predicted vector is calculated under a resolution corresponding to a downsampling ratio of 1/4, and this resolution is the same as the resolution corresponding to f. Therefore, it may be obtained that a first motion vector MV1 is equal to MVD1/4+MV2. A target reference block is obtained according to MV1. A predicted value corresponding to the to-be-decoded block is obtained according to the target reference block, and a prediction residual p1 is added to the predicted value to obtain a reconstructed block corresponding to the reconstructed video frame f1 through reconstruction.

4. The resolution information obtaining unit of the mixed-resolution decoding framework obtains encoded data corresponding to the third to-be-decoded video frame g. It may be appreciated that, encoded data corresponding to g is data obtained by encoding c1. Inter-frame decoding is performed on g, to obtain a reconstructed video frame g1. Because the resolution information corresponding to g is 1/8, the reconstructed video frame g1 may be upsampled by using a sampling ratio of 8, to obtain a decoded video frame g2.

A decoding process is as follows: because g is an inter-predicted frame, the reconstructed video frame f1 needs to be used as a current reference frame. It may be appreciated that, f1 is the same as b2, and f1 is sampled in the same manner as b2, to obtain f3. Herein, f3 is the same as b3, and is used as a target reference frame. It is obtained from the encoded data that a motion vector difference corresponding to the current to-be-decoded block is MVD2. Because MVD2 is under a target resolution, that is, an original resolution, MVD2 needs to be converted into a motion vector difference under a resolution corresponding to g. Therefore, it may be obtained that MVD2 is MVD1/8. It is obtained that an initial predicted vector is MV4. Because the initial predicted vector is calculated under a resolution corresponding to a downsampling ratio of 1/4, the initial predicted vector needs to be transformed into a predicted vector under a resolution corresponding to f. A downsampling ratio corresponding to f is 1/8, and therefore, it may be obtained that a first motion vector MV3 is equal to MVD2/8+MV4/2. A target reference block is obtained according to MV3. A predicted value corresponding to the to-be-decoded block is obtained according to the target reference block, and a prediction residual p2 is added to the predicted value to obtain a reconstructed block corresponding to the reconstructed video frame g1 through reconstruction.

5. The receiving terminal plays e2, f2, and g2.

Figure 12:
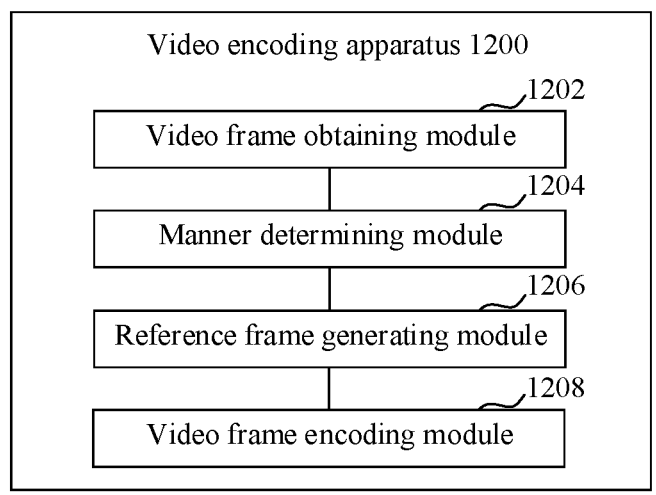
FIG. 12 is a block diagram of a video encoding apparatus according to an embodiment.

FIG. 12 is a block diagram of a video encoding apparatus 1200 according to an embodiment. The apparatus includes a video frame obtaining module 1202, a manner determining module 1204, a reference frame generating module 1206, and a video frame encoding module 1208.

The video frame obtaining module 1202 is configured to obtain a to-be-encoded video frame.

The manner determining module 1204 is configured to determine a resolution determining mechanism of a current reference frame according to a resolution relationship between the to-be-encoded video frame and a reference frame corresponding to the to-be-encoded video frame.

The reference frame generating module 1206 is configured to generate the current reference frame corresponding to the to-be-encoded video frame according to the resolution determining mechanism.

The video frame encoding module 1208 is configured to encode the to-be-encoded video frame according to the current reference frame to obtain encoded data corresponding to the to-be-encoded video frame, the encoded data including identification information representing the resolution relationship.

In an embodiment, the video frame obtaining module 1202 is further configured to obtain an input video frame; determine a resolution determining mechanism of a to-be-encoded video frame corresponding to the input video frame; and generate the to-be-encoded video frame based on the input video frame according to the resolution determining mechanism of the to-be-encoded video frame.

In an embodiment, the video frame obtaining module 1202 is further configured to determine a video frame sequence to which the input video frame belongs; obtain the resolution relationship between the to-be-encoded video frame and the corresponding reference frame from header information of the video frame sequence; and determine the resolution determining manner of the to-be-encoded video frame corresponding to the input video frame according to the read resolution relationship.

In an embodiment, the video frame obtaining module 1202 is further configured to: obtain, in a case that the resolution relationship exists in sequence header information of the video frame sequence, the resolution relationship between the to-be-encoded video frame and the corresponding reference frame from the sequence header information, an application range of the resolution relationship being a frame sequence range; and obtain, in a case that the resolution relationship does not exist in the sequence header information of the video frame sequence, the resolution relationship between the to-be-encoded video frame and the corresponding reference frame from video frame group header information of the video frame sequence, an application range of the resolution relationship being a frame group range.

In an embodiment, the video frame encoding module 1208 is further configured to: obtain resolution information of the to-be-encoded video frame and the current reference frame; determine a sampling method of the current reference frame according to the resolution information; sample the current reference frame according to the sampling method and the resolution information of the to-be-encoded video frame, to obtain a target reference frame; and encode the to-be-encoded video frame according to the target reference frame to obtain encoded data of the to-be-encoded video frame.

In an embodiment, the video frame encoding module 1208 is further configured to: determine that the sampling method of the current reference frame is a downsampling processing in a case that a resolution indicated by the resolution information of the to-be-encoded video frame is less than a resolution indicated by the resolution information of the current reference frame; and determine that the sampling method of the current reference frame is an upsampling processing in a case that a resolution indicated by the resolution information of the to-be-encoded video frame is greater than a resolution indicated by the resolution information of the current reference frame.

In this embodiment, a resolution determining mechanism of a current reference frame is determined according to a resolution relationship between a to-be-encoded video frame and a corresponding reference frame, so that the current reference frame matching a resolution of the to-be-encoded video frame can be flexibly selected according to the resolution determining mechanism of the reference frame. The current reference frame can still be used as a reference frame of the to-be-encoded video frame even if the current reference frame has a resolution different from that of the to-be-encoded video frame, thereby improving the use efficiency of the reference frame. The to-be-encoded video frame is encoded according to the current reference frame. By flexibly selecting the current reference frame having the matching resolution, the accuracy of encoding is improved, thereby improving the encoding quality of the video frame. By selecting the current reference frame having the matching resolution, the encoding efficiency is also improved.

Figure 13:
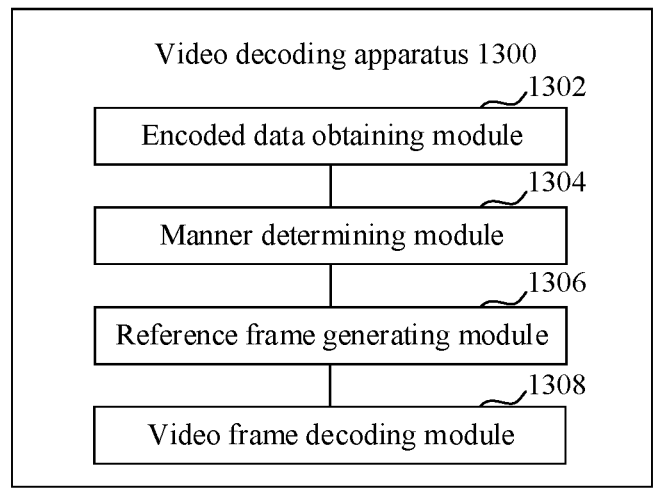
FIG. 13 is a block diagram of a video decoding apparatus according to an embodiment.

FIG. 13 is a block diagram illustrating a video decoding apparatus 1300 according to an embodiment. The apparatus includes the following content: an encoded data obtaining module 1302, a manner determining module 1304, a reference frame generating module 1306, and a video frame decoding module 1308.

The encoded data obtaining module 1302 is configured to obtain encoded data of a to-be-decoded video frame.

The manner determining module 1304 is configured to determine a resolution determining mechanism of a current reference frame according to identification information that is in the encoded data and that represents a resolution relationship.

The reference frame generating module 1306 is configured to generate the current reference frame corresponding to the to-be-decoded video frame according to the resolution determining mechanism.

The video frame decoding module 1308 is configured to decode the to-be-decoded video frame according to the current reference frame, to obtain a reconstructed video frame corresponding to the to-be-decoded video frame.

In an embodiment, the video frame decoding module 1308 is further configured to: obtain resolution information of the to-be-decoded video frame and the current reference frame; determine a sampling method of the current reference frame according to the resolution information; sample the current reference frame according to the sampling method and the resolution information of the to-be-decoded video frame, to obtain a target reference frame; and decode the to-be-decoded video frame according to the target reference frame, to obtain the reconstructed video frame corresponding to the to-be-decoded video frame.

In an embodiment, the video frame decoding module 1308 is further configured to: determine that the sampling method of the current reference frame is a downsampling processing in a case that a resolution indicated by the resolution information of the to-be-decoded video frame is less than a resolution indicated by the resolution information of the current reference frame; and determine that the sampling method of the current reference frame is an upsampling processing in a case that a resolution indicated by the resolution information of the to-be-decoded video frame is greater than a resolution indicated by the resolution information of the current reference frame.

In an embodiment, the video frame decoding module 1308 is further configured to: determine a reconstructed video frame sampling manner according to the identification information representing the resolution relationship; sample the reconstructed video frame according to the reconstructed video frame sampling manner, to obtain a decoded video frame; and obtain a decoded video frame sequence according to the decoded video frame.

In an embodiment, the video frame decoding module 1308 is further configured to: determine an application range of the resolution relationship, the application range including a frame sequence range and a frame group range; and sample a reconstructed video frame corresponding to the application range according to the reconstructed video frame sampling manner, to obtain a decoded video frame corresponding to the application range.

In an embodiment, the video frame decoding module 1308 is further configured to: sample a reconstructed video frame corresponding to the frame group range according to the reconstructed video frame sampling manner to obtain a decoded video frame corresponding to the frame group range; generate a decoded video frame group according to the decoded video frame corresponding to the frame group range; and form a decoded video frame sequence according to the generated decoded video frame group.

In this embodiment, a sampling manner of a current reference frame corresponding to a to-be-decoded video frame can be flexibly selected, so that the current reference frame is correspondingly sampled to obtain a target reference frame. Then, the to-be-decoded video frame is decoded according to the target reference frame, to obtain a reconstructed video frame. The sampling manner of the current reference frame can be selected flexibly to perform sampling and reconstruction on the current reference frame and adjust a resolution of the current reference frame. Therefore, the current reference frame, even if having a resolution different from that of the current to-be-decoded video frame, may still be used as a reference frame, thereby improving the use efficiency of the reference frame, improving the accuracy of inter-frame prediction, reducing a prediction residual, and improving the quality of a decoded image.

Figure 14:
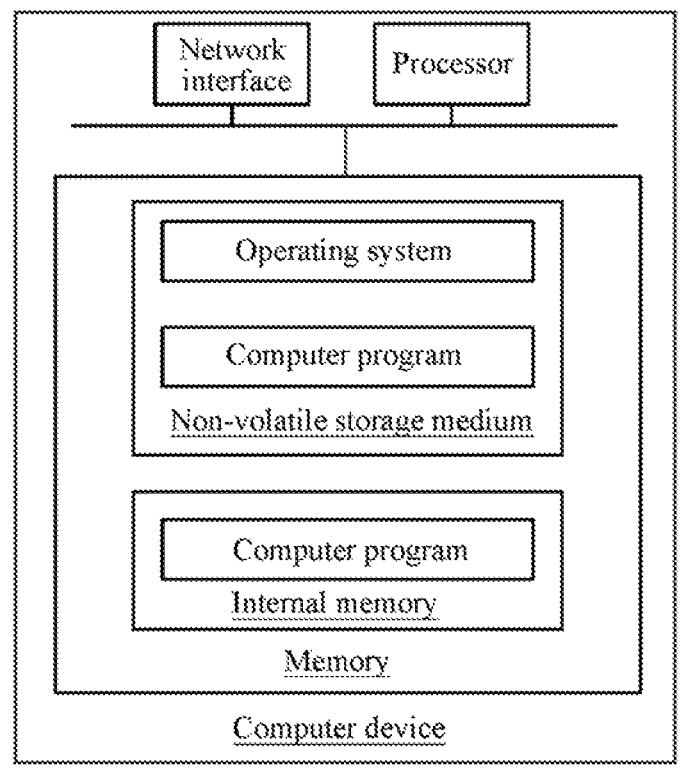
FIG. 14 is a schematic diagram of an inner structure of a computer device according to an embodiment.

FIG. 14 is a schematic diagram of an inner structure of a computer device according to an embodiment. Referring to FIG. 13, the computer device may be the server 110 or the terminal 120 in FIG. 1. The computer device includes a processor, a memory, and a network interface that are connected by using a system bus. The memory includes a non-volatile storage medium and an internal memory. The non-volatile storage medium of the computer device may store an operating system and a computer program. When being executed, the computer program may cause the processor to perform a video encoding method or a video decoding method. The processor of the computer device is configured to provide calculation and control capabilities, to support running of the entire computer device. The internal memory may store a computer program. When being executed by the processor, the computer program may cause the processor to perform the video encoding method or the video decoding method. The network interface of the computer device is configured to perform network communication.

A person skilled in the art may understand that the structure shown in FIG. 14 is only an example diagram of a partial structure related to the disclosure, and does not limit the scope of computer device or server. Specifically, the computer device may include more or fewer components than those shown in the drawings, or some components may be combined, or a different component deployment may be used.

In an embodiment, the video encoding apparatus 1200 provided may be implemented in a form of a computer program. The computer program may run on the computer device shown in FIG. 14. The memory of the computer device may store program modules or codes forming the video encoding apparatus, for example, the video frame obtaining module 1202, the manner determining module 1204, the reference frame generating module 1206, and the video frame encoding module 1208 shown in FIG. 12. The computer program formed by the various program modules causes the processor to perform the steps of the video encoding method described in the embodiments of the disclosure.

For example, the computer device shown in FIG. 14 may obtain a to-be-encoded video frame by using the video frame obtaining module 1202 shown in FIG. 12. The computer device may determine, by using the manner determining module 1204, a resolution determining mechanism of a current reference frame corresponding to the to-be-encoded video frame according to a resolution relationship between the to-be-encoded video frame and a corresponding reference frame. The computer device may generate, by using the reference frame generating module 1206, the current reference frame corresponding to the to-be-encoded video frame according to the resolution determining mechanism. The computer device may encode, by using the video frame encoding module 1208, the to-be-encoded video frame according to the current reference frame, to obtain encoded data corresponding to the to-be-encoded video frame, the encoded data including identification information representing the resolution relationship.

In an embodiment, the video decoding apparatus 1300 may be implemented in a form of a computer program. The computer program may run on the computer device shown in FIG. 14. The memory of the computer device may store program modules forming the video decoding apparatus, for example, the encoded data obtaining module 1302, the manner determining module 1304, the reference frame generating module 1306, and the video frame decoding module 1308 shown in FIG. 13. The computer program formed by the various program modules causes the processor to perform the steps of the video encoding method described in the embodiments of the disclosure.

For example, the computer device shown in FIG. 14 may obtain encoded data of a to-be-decoded video frame by using the encoded data obtaining module 1302 shown in FIG. 13. The computer device may determine, by using the manner determining module 1304, a resolution determining mechanism of a current reference frame according to identification information that is in the encoded data and that represents a resolution relationship. The computer device may generate, by using the reference frame generating module 1306, the current reference frame corresponding to the to-be-decoded video frame according to the resolution determining mechanism. The computer device may decode, by using the video frame decoding module 1308, the to-be-decoded video frame according to the current reference frame, to obtain a reconstructed video frame corresponding to the to-be-decoded video frame.

According to an embodiment, there is provided a computer device, including: a memory and a processor, the memory storing a computer program, the computer program, when being executed by the processor, causing the processor to perform the video encoding method provided in the foregoing embodiment.

In this embodiment, a resolution determining mechanism of a current reference frame is determined according to a resolution relationship between a to-be-encoded video frame and a corresponding reference frame, so that the current reference frame matching a resolution of the to-be-encoded video frame can be flexibly selected according to the resolution determining mechanism of the reference frame. The current reference frame can still be used as a reference frame of the to-be-encoded video frame even if the current reference frame has a resolution different from that of the to-be-encoded video frame, thereby improving the use efficiency of the reference frame. The to-be-encoded video frame is encoded according to the current reference frame. By flexibly selecting the current reference frame having the matching resolution, the accuracy of encoding is improved, thereby improving the encoding quality of the video frame. By selecting the current reference frame having the matching resolution, the encoding efficiency is also improved.

According to an embodiment, there is provided a computer device, including: a memory and a processor, the memory storing a computer program, the computer program, when being executed by the processor, causing the processor to perform the video decoding method provided in the foregoing embodiment.

In this embodiment, a sampling method of a current reference frame corresponding to a to-be-decoded video frame can be flexibly selected, so that the current reference frame is correspondingly sampled to obtain a target reference frame. Then, the to-be-decoded video frame is decoded according to the target reference frame, to obtain a reconstructed video frame. The sampling method of the current reference frame can be selected flexibly to perform sampling and reconstruction on the current reference frame and adjust a resolution of the current reference frame. Therefore, the current reference frame, even if having a resolution different from that of the current to-be-decoded video frame, may still be used as a reference frame, thereby improving the use efficiency of the reference frame, improving the accuracy of inter-frame prediction, reducing a prediction residual, and improving the quality of a decoded image.

According to an embodiment, there is provided a storage medium storing a computer program, the computer program being executed by a processor to implement the video encoding method provided in the foregoing embodiment.

According to an embodiment, there is provided a storage medium storing a computer program, the computer program being executed by a processor to implement the video decoding method provided in the foregoing embodiment.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments may be performed. Any reference to a memory, a storage, a database, or another medium used in the embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (DRAM).

The technical features in the foregoing embodiments may be randomly combined. For concise description, not all possible combinations of the technical features in the embodiment are described. However, the combinations of the technical features are all to be considered as falling within the scope of the disclosure.

The foregoing embodiments only describe several implementations of the present disclosure, and their description is specific and detailed, but should not be understood as a limitation to the scope of the disclosure. A person of ordinary skill in the art may make variations and improvements without departing from the spirit of the present disclosure, and the variations and improvements belong to the protection scope of the present disclosure. Therefore, the protection scope of the patent of the present disclosure is subject to the appended claims.

What is claimed is:

1. A method, performed by a computer device, the method comprising:
    obtaining a current frame to be encoded;
    determining a resolution of the current frame;
    generating a reference frame according to the resolution of the current frame; and
    encoding the current frame according to the reference frame to obtain encoded data of the current frame, the encoded data comprising a resolution relationship between the current frame and the reference frame,
    wherein the encoding current frame according to the reference frame comprises:
        obtaining resolution information of the current frame and the reference frame;
        down-sampling the reference frame based on the resolution information indicating that a resolution of the current frame is less than a resolution of the reference frame to obtain a target reference frame or up-sampling the reference frame based on the resolution information indicating that the resolution of the current frame is greater than the resolution of the reference frame to obtain the target reference frame; and
        encoding the current frame according to the target reference frame to obtain the encoded data of the current frame.

2. The method according to claim 1, wherein the obtaining the current frame further comprises:
    obtaining an input video frame;
    determining the resolution of the current frame corresponding to the input video frame; and
    generating the current frame based on the input video frame according to the resolution of the current frame.

3. The method according to claim 2, wherein the determining the resolution of the current frame corresponding to the input video frame comprises:
    determining a video frame sequence in which the input video frame is included;
    obtaining the resolution relationship between the current frame and the reference frame from header information of the video frame sequence; and
    determining the resolution of the current frame corresponding to the input video frame based on the obtained resolution relationship.

4. The method according to claim 3, wherein the obtaining the resolution relationship between the current frame and the corresponding reference frame from the header information of the video frame sequence comprises:
    based on determining that the resolution relationship is in sequence header information of the video frame sequence, obtaining the resolution relationship between the current frame and the corresponding reference frame from the sequence header information, and determining that an application range of the resolution relationship is a frame sequence range; or
    based on determining that the resolution relationship is not in the sequence header information of the video frame sequence, obtaining the resolution relationship between the current frame and the corresponding reference frame from video frame group header information of the video frame sequence, and determining that the application range of the resolution relationship is a frame group range.

5. The method according to claim 1, wherein the down-sampling comprises at least one of a direct averaging, a filter, a bicubic interpolation, or a bilinear interpolation.

6. The method according to claim 1, wherein a down-sampling ratio for performing the down-sampling is at least one of a predetermined value or a ratio determined according to an encoding location of the input video frame.

7. An apparatus, comprising:
    at least one memory storing computer program code; and
    at least one processor configured to access the at least one memory and operate as instructed by the computer program code, the computer program code comprising:
        video frame obtaining code configured to cause the at least one processor to obtain a current frame;
        determining code configured to cause the at least one processor to determine a resolution of the current frame;
        reference frame generating code configured to cause the at least one processor to generate a reference frame according to the resolution of the current frame; and
        video frame encoding code configured to cause the at least one processor to encode the current frame according to the reference frame to obtain encoded data of the current frame, the encoded data comprising a resolution relationship between the current frame and the reference frame,
    wherein the video frame encoding code is further configured to cause the at least one processor to:
        obtain resolution information of the current frame and the reference frame;
        down-sample the reference frame based on the resolution information indicating that a resolution of the current frame is less than a resolution of the reference frame to obtain a target reference frame or up-sample the reference frame based on the resolution information indicating that the resolution of the current frame is greater than the resolution of the reference frame to obtain the target reference frame; and encode the current frame according to the target reference frame to obtain the encoded data of the current frame.

8. The apparatus according to claim 7, wherein the video frame obtaining code is further configured to cause the at least one processor to:
obtain an input video frame;
determine the resolution of the current frame corresponding to the input video frame; and
generate the current frame based on the input video frame according to the resolution of the current frame.

9. The apparatus according to claim 8, wherein the video frame obtaining code is further configured to cause the at least one processor to:
determine a video frame sequence in which the input video frame is included;
obtain the resolution relationship between the current frame and the reference frame from header information of the video frame sequence; and
determine the resolution of the current frame corresponding to the input video frame based on the obtained resolution relationship.

10. The video encoding apparatus according to claim 9, wherein the video frame obtaining code is further configured to cause the at least one processor to:
based on determining that the resolution relationship is in sequence header information of the video frame sequence, obtain the resolution relationship between the current frame and the corresponding reference frame from the sequence header information, and determine that an application range of the resolution relationship is a frame sequence range; or
based on determining that the resolution relationship is not in the sequence header information of the video frame sequence, obtain the resolution relationship between the current frame and the corresponding reference frame from video frame group header information of the video frame sequence, and determine that the application range of the resolution relationship is a frame group range.

11. The video encoding apparatus according to claim 7, wherein the video frame encoding code is further configured to cause the at least one processor to down-sample the reference frame according to at least one of a direct averaging, a filter, a bicubic interpolation, or a bilinear interpolation.

12. The video encoding apparatus according to claim 7, wherein the video frame encoding code is further configured to cause the at least one processor to down-sample the reference frame according to a down-sampling ratio, and
wherein the down-sampling ratio is at least one of a predetermined value or a ratio determined according to an encoding location of the input video frame.

13. A non-transitory computer readable storage medium storing at least one computer program code configured to cause at least one computer processor to:
obtain a current frame;
determine a resolution of the current frame;
generate a reference frame according to the resolution of the current frame; and
encode the current frame according to the reference frame to obtain encoded data corresponding to the current frame, the encoded data comprising a resolution relationship between the current frame and the reference frame,
wherein the at least one computer processor is further configured to:
obtain resolution information of the current frame and the reference frame;
down-sample the reference frame based on the resolution information indicating that a resolution of the current frame is less than a resolution of the reference frame to obtain a target reference frame or up-sample the reference frame based on the resolution information indicating that the resolution of the current frame is greater than the resolution of the reference frame to obtain the target reference frame; and
encode the current frame according to the target reference frame to obtain the encoded data of the current frame.

14. The non-transitory computer readable storage medium according to claim 13, wherein the at least one computer program code is configured to cause the at least one computer processor to:
obtain an input video frame;
determine the resolution of the current corresponding to the input video frame; and
generate the current frame based on the input video frame according to the resolution of the current frame.

* * * * *